US009175562B2

(12) United States Patent
Casey

(10) Patent No.: US 9,175,562 B2
(45) Date of Patent: Nov. 3, 2015

(54) ROTARY ENGINE

(75) Inventor: Raymond Charles Casey, Leumeah (AU)

(73) Assignee: Breville Pty Limited, Alexandria, New South Wales (AU)

( * ) Notice: Subject to any disclaimer, the term of this patent is extended or adjusted under 35 U.S.C. 154(b) by 658 days.

(21) Appl. No.: 13/417,323

(22) Filed: Mar. 12, 2012

(65) Prior Publication Data
US 2013/0061828 A1 Mar. 14, 2013

(30) Foreign Application Priority Data
Mar. 29, 2011 (AU) ................................ 2011901173

(51) Int. Cl.
*F02B 53/00* (2006.01)
*F01C 1/06* (2006.01)
*F02B 53/02* (2006.01)

(52) U.S. Cl.
CPC . *F01C 1/06* (2013.01); *F02B 53/02* (2013.01); *Y02T 10/17* (2013.01)

(58) Field of Classification Search
CPC ............ F01C 3/02; F01C 1/063; F02B 53/02; Y02T 10/17
USPC ......... 123/208, 228, 200, 203, 223, 229, 206, 123/18 R; 418/88, 222, 195, 243, 38
See application file for complete search history.

(56) References Cited

U.S. PATENT DOCUMENTS

| | | | | |
|---|---|---|---|---|
| 1,013,885 | A | * | 1/1912 | McConnell .................... 123/201 |
| 1,017,971 | A | * | 2/1912 | Heldt ............................. 418/212 |
| 1,349,111 | A | | 8/1920 | Santos Y Suarez et al. |
| 2,317,514 | A | | 3/1945 | Gold et al. |
| 2,760,466 | A | * | 8/1956 | Black, Jr. ........................ 123/203 |
| 2,944,533 | A | * | 7/1960 | Park .............................. 123/249 |
| 3,323,500 | A | * | 6/1967 | Murin ........................... 123/228 |
| 4,683,852 | A | * | 8/1987 | Kypreos-Pantazis ......... 123/230 |
| 4,808,934 | A | * | 2/1989 | Yokoyama et al. ...... 324/207.25 |
| 5,009,206 | A | * | 4/1991 | Yi ................................... 123/248 |
| 5,138,994 | A | * | 8/1992 | Maday .......................... 123/248 |
| 5,724,943 | A | * | 3/1998 | Blount et al. ................. 123/476 |
| 6,276,329 | B1 | * | 8/2001 | Archer .......................... 123/228 |
| 7,305,963 | B2 | * | 12/2007 | Zak .............................. 123/228 |
| 8,151,759 | B2 | * | 4/2012 | Wright .......................... 123/233 |

FOREIGN PATENT DOCUMENTS

DE 4305342 9/1994

* cited by examiner

*Primary Examiner* — Jorge Pereiro
*Assistant Examiner* — Jason T Newton
(74) *Attorney, Agent, or Firm* — Molins & Co. Pty. Ltd.

(57) ABSTRACT

A rotary engine is provided. The engine has a main body that fits within a housing to form an annular chamber. A piston moves within the annular chamber along an annular path. A door assembly operates to block and unblock the annular chamber, opening to unblock the chamber as the piston approaches the door and closes to block the chamber after the piston has travelled past the door. A temporary combustion chamber is formed between the closed door and the piston as the piston moves away from the door.

20 Claims, 19 Drawing Sheets

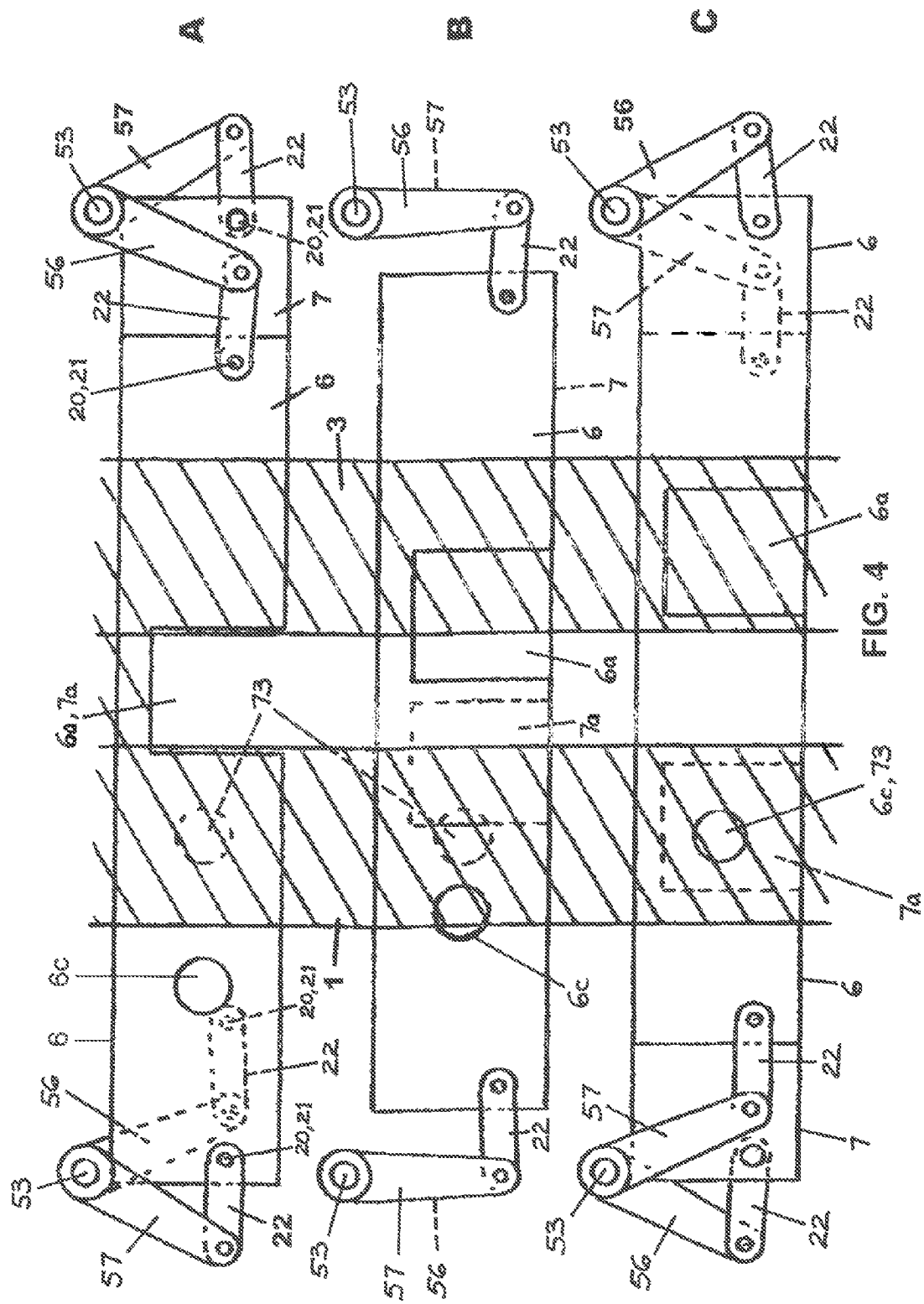

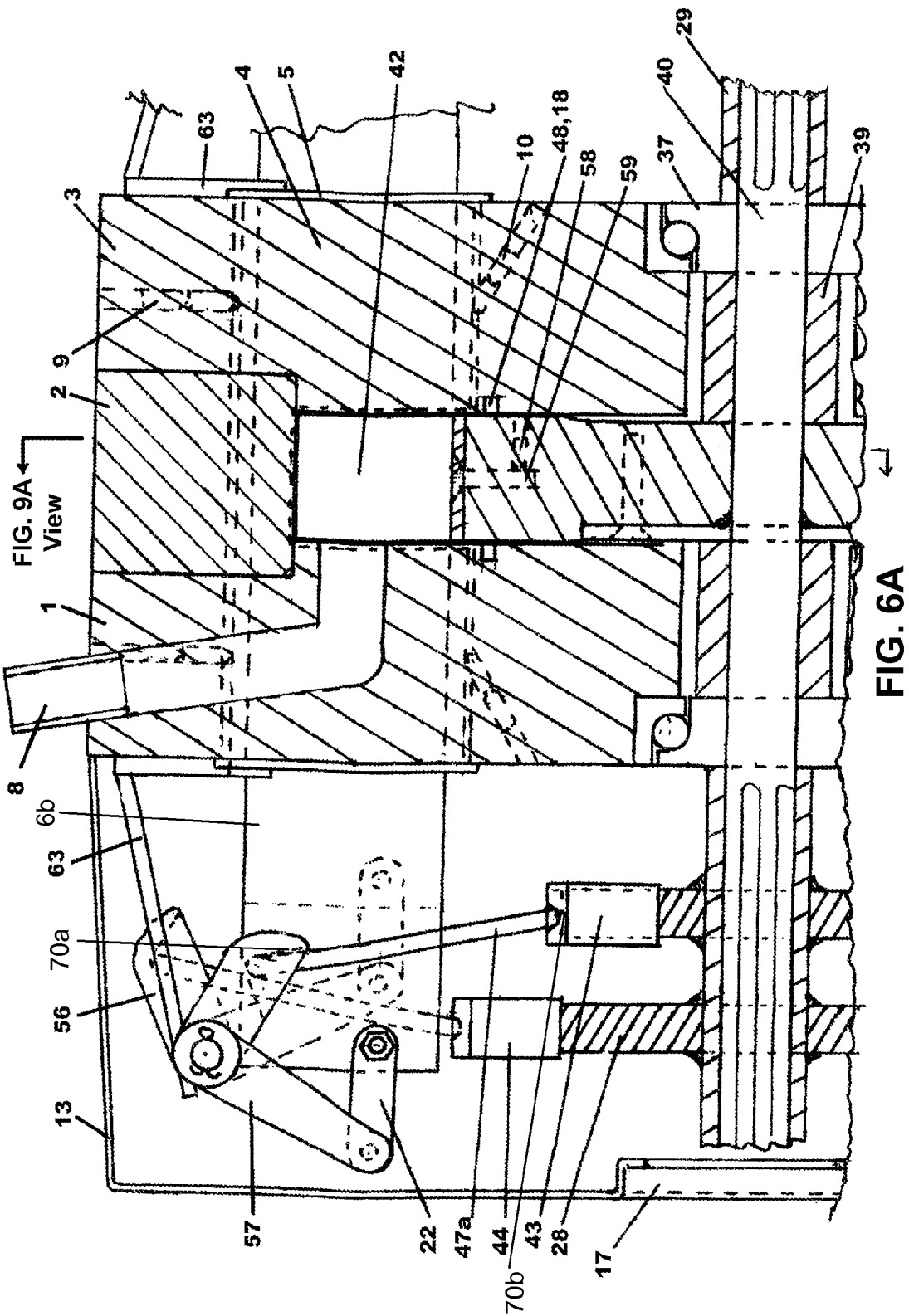

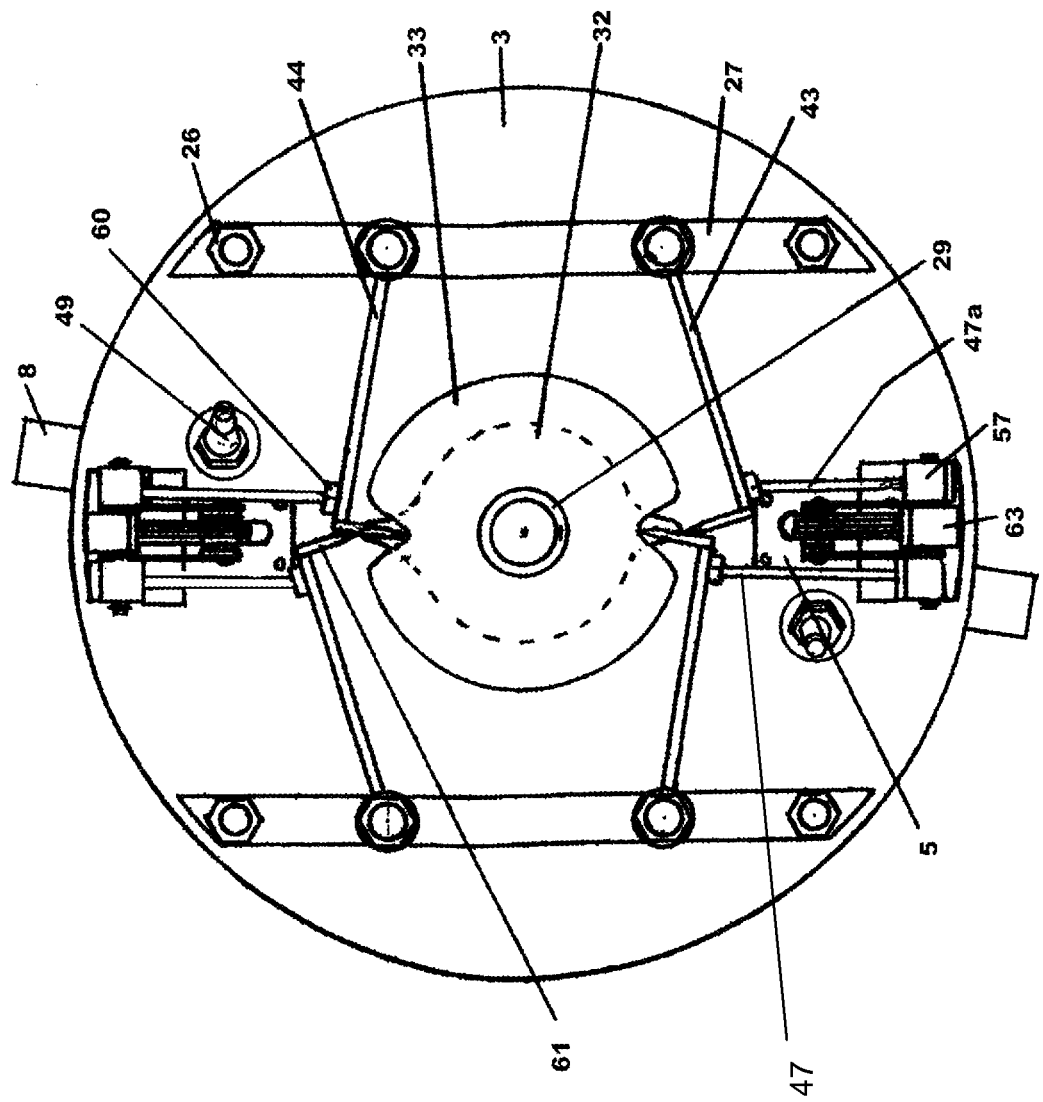

ROTARY ENGINE

TECHNICAL FIELD

The present invention relates to a rotary engine.

BACKGROUND ART

Reciprocating steam engines were first invented by James Watt who used the property of expansion of gases in conjunction with sliding plate valves to control the path of steam and water squirted into a cylinder to make the steam contract and move a piston. The development of this basic engine led the way to the plethora of steam engines that would power the industrial revolution.

The development of more modern engines began with an engine principle proposed in 1862 by Beau de Rochas, which was later modified by Nicholas Otto and patented in 1876. That contrivance was further developed to become much later the modern Otto engine that is widely used today to power automobiles, ships and planes.

The Otto engine has four strokes in two revolutions of the engine for one sequence cycle that may be either self ignited (diesel) or spark ignited. The strokes are, in order, input stroke, compression stroke, power stroke, and exhaust stroke.

Two stroke engines, used on today's motor bikes, were a later development, and combined the four strokes to occur in one revolution of the engine. A problem with such engines has been that exhaust gases mix with incoming fuel/air gases during the input/compression stroke, and this contamination limits the engine efficiency.

The development of engines was accelerated by the world wars, which led to supercharger Otto engines for planes, jet engines, and liquid fueled engines for rockets. Jet engines and rocket engines produce high output thrust but at a cost of high fuel usage.

The expansion properties of gases have been used to drive all of the aforementioned engines. However, as the world's supply of accessible fossil fuels becomes depleted, and high quality fuels for automobiles becomes more expensive, there is an ever increasing demand for improved output from smaller and more efficient engines.

Although the world's attention is gradually focusing on alternative energy sources to combustible fossil fuels, and there is a desire in some circles to replace engines with electric motors for automobiles, current technology is not at a stage where engines can be replaced with, say, fuel cell or battery powered electric cars. A smaller and more efficient engine using fossil fuels (and especially low grade fuels) to power automobiles, electric generators and other machinery would be a great advantage.

Properly developed rotary engines are ideally placed to serve this purpose. A rotary engine was patented in 1912 using sliding doors in a four stroke emulation of the four stroke Otto reciprocating principle, but in a rotary chamber. There have been many subsequent developments using the same system of partitioning the chamber space, such as by using sliding doors or rotating disc doors to block and unblock the swept chamber space into compartments, thereby emulating the four strokes of the Otto engine.

It is a serious limitation of such rotary engines that the doors are moved whilst there is still pressure within the chamber. The presence of high chamber pressures slows the opening of the doors because of the creation of high frictional loads on the doors. To be most efficient, the doors must be moved very quickly, and this requires lowering the frictional resistance that presently acts upon the doors as they move under high chamber pressures.

It has been found by the present inventor that this limitation can be overcome by providing a rotary engine that is so assembled and operated to release chamber pressure into an exhaust path from the chamber as the piston moves towards the doors but just before the doors begin to be opened.

It is another limitation of prior art rotary engines that their use of cam rollers further reduces their efficiency by increasing the time the doors are in motion, as the cam rollers effectively widen the cam lobes.

There are numerous other limitations of prior art rotary engines which the present inventor has overcome by the present invention.

DISCLOSURE OF INVENTION

It is, therefore, an object of the present invention to overcome or substantially ameliorate the disadvantages and problems of the aforementioned prior art, or at least provide a useful alternative.

It has been found by the present inventor that these and other objects of the invention may be achieved in general by providing a rotary engine comprising a housing, a drive shaft extending through the housing, a rotor coupled to the drive shaft, the rotor including a main body and a piston extending outwardly therefrom, the main body adapted to fit within the housing so as to form an annular chamber with the walls of the housing, the piston being movable within the annular chamber along an annular path and being shaped to fit closely to the walls of the annular chamber so as to provide a substantial seal without being prohibited from rotation, first and second cam assemblies mounted on the drive shaft on opposite sides externally of the housing, a door assembly operating to block and unblock the annular chamber, the door assembly actuated by synchronous rotation of the first and second cam assemblies such that the door assembly opens to unblock the annular chamber as the piston approaches the door assembly and closes to block the annular chamber after the piston has travelled past the door assembly, a temporary combustion chamber being formed between the closed door assembly and the piston as the piston moves away from the door assembly, a fluid inlet for providing a working fluid into the temporary combustion chamber, a fuel inlet for providing a fuel into the temporary combustion chamber, an ignition source, an exhaust path from the annular chamber, wherein, in use, the ignition source ignites a mixture of the fuel and the working fluid within the temporary combustion chamber and the explosion therefrom forces the piston along the annular path to thereby rotate the drive shaft, and wherein pressure from the explosion within the chamber is released from the chamber into the exhaust path as the piston moves towards the door assembly but before the door assembly is reopened, thereby enabling the door assembly to reopen without frictional resistance due to pressure of the explosion within the chamber.

Preferably, there is a plurality of door assemblies, each including first and second door plates movable with respect to one another, the door plates cooperating to block and unblock the annular chamber.

The first and second door plates of each door assembly are preferably guided by a door carriage assembly mounted in the housing.

In a preferred form, each cam assembly includes two or more inward cam lobes and two or more outward cam lobes which are operated to move the door plates.

Preferably, the piston is a piston plate, and there is a plurality of piston plates extending outwardly from the body of the rotor and evenly spaced about the circumference of the rotor. The number of piston plates is equal to the number of door assemblies. The number of strokes in one revolution of this rotary engine is dependent on the number of piston plates.

In a further preferred form, the door plates each have a slot therein adapted to allow passage of the piston therethrough such that when the slots align the annular chamber is unblocked, and the piston can pass through the aligned slots. This is the doors open position.

Preferably, the exhaust path includes an exhaust hole in the annular chamber which communicates with an exhaust port from the engine, the exhaust hole being uncovered by the approach of the piston to the door assembly.

In another preferred form of the invention, the housing is cylinder shaped and comprises an outer ring between two opposed side wall plates with attached oil retaining covers. There are bearings in the centre of an outer wall of the side wall plates.

In a preferred form of the invention, each door carriage assembly allows the first and second door plates to slide with respect to one another within the door carriage assembly across the engine.

The drive shaft and the coupled rotor may rotate between the side wall plates on the bearings in the side wall plates. There are preferably ring seals in each side wall plate to prevent escape of gases from the combustion chamber.

Each cam lobe preferably has a cam follower and pad to follow the movement of the lobe and convey the movement from a socket attached to an arm of the cam follower to a push rod.

Each cam follower preferably pivots on a shaft fixed to a side wall plate.

Preferably, each door plate is pushed from a start position (the doors closed position) across the engine in a first direction by movement of an outward cam lobe of the first cam assembly at one side of the housing until it reaches a maximum lobe extension position (the doors open position) while on the other side of the housing an inward cam lobe of the second cam assembly retreats with opposite movement, then the inward cam lobe of the second cam assembly pushes to cause the first door plate to move across the engine in a second direction opposite to the first direction and return the first door plate to the start position (the doors closed position), while similarly on the opposite side of the housing the outward cam lobe of the second cam assembly pushes the second door plate across the engine until it reaches a maximum lobe extension position (the doors open position) while the inward cam lobe of the first cam assembly retreats with opposite movement, then the inward cam lobe of the first cam assembly pushes to cause the second door plate to move back across the engine to the doors closed position while the outward cam lobe of the first cam assembly retreats with opposite movement to the doors closed position.

In this way, the first and second door plates move in opposite directions to each other across the engine, thereby allowing the or each door assembly to move from the doors closed position to the doors open position and back to the doors closed position.

Both the first and second door plates of a door assembly slide in opposite directions by the above described push and retreat movement of the cam lobes.

Preferably, the slot in each door plate is just wider than the width of the annular chamber, so that when the cam lobes are at their maximum lobe extension position the slots of the doors are aligned and the piston can pass through the aligned slots (the doors open position) without collision.

Preferably, for each door assembly, there is a fuel injector, an air injector (air being the preferred working fluid) and a spark plug (being the preferred ignition source) located in the temporary combustion chamber formed between the closed door assembly and the piston as the piston moves away from the door assembly (that is, on the piston receding side of the door assembly), and there is an exhaust hole located between the closed door assembly and the piston as the piston moves towards the door assembly (that is, on the piston approaching side of the door assembly).

An air compressor powered by the rotation of the drive shaft may supply compressed air to an air accumulator and regulator to feed compressed air to the air injectors.

A fuel pump may supply fuel under pressure to a fuel accumulator and regulator to feed fuel to the fuel injectors. The fuel includes any one or a compatible combination of petroleum, alcohol, liquid petroleum gas (LPG) or hydrogen gas.

Therefore, fuel and air may be injected into the temporary combustion chamber at high pressure from respective pressurized sources, such as pressure tanks.

An electronic control unit may be triggered by sensors that detect the position of the rotating pistons to timely control the fuel injectors, the air injectors and the ignition source.

A single power stroke of the preferred rotary engine consists of a dead band section and a power producing section, and the power stroke is coincident with the exhaust stroke. The number of such strokes in one revolution of this rotary engine will depend on the number of pistons and corresponding number of door assemblies that cooperate to form temporary combustion chambers.

The rotary engine may use a wide range of combustible fuels from slow burn to very fast burn.

The temporary combustion chambers preferably contain no residual exhaust gases to contaminate the fuel and air mixture when ignited.

For one stroke of the rotary engine, either of two modes of engine operation may occur. One mode uses one injection of fuel and air before ignition (referred to as the normal power stroke mode), and the other mode uses multiple injections of fuel and air before ignition (referred to as the pulse mode).

The rotary engine may operate as a motor, and may be switched between operation as an engine and operation as a motor by switch selections on the electronic control unit. This may be especially suited for forklift vehicles operating inside and outside of a factory to reduce or prevent build up of exhaust fumes inside the factory.

The rotary engine may produce the same high torque over its full extent of revolution at full throttle.

Many of these desirable features can be achieved because the door assembly may be moved to open and close very quickly due to lowered friction arising from the dumping of high chamber pressure following combustion into an exhaust path from the chamber as the piston moves towards the next door assembly (at the end of the power stroke and just before the door assembly begins to be opened), and because of the low mass of the moving parts.

There has been thus outlined, rather broadly, the more important features of the invention in order that the detailed description thereof that follows may be better understood and put into practical effect, and in order that the present contribution of the inventor to the art may be better appreciated.

There are additional features of the invention that will be described hereinafter. As such, those skilled in the art will appreciate that the conception, upon which the disclosure is based, may be readily utilized as the basis for designing other assemblies and processes for carrying out the objects of the present invention.

It is important, therefore, that the broad outline of the invention described above be regarded as including such equivalent constructions in so far as they do not depart from the spirit and scope of the present invention.

BRIEF DESCRIPTION OF THE DRAWINGS

The invention will be better understood and objects other than those set forth above will become apparent when consideration is given to the following detailed description thereof. Such description makes reference to the accompanying drawings, in which:

FIG. 4 is a three stage side view of the door plates of the rotary engine of FIGS. 1 to 3 during operation, showing a doors open position (stage A), a door slots overlapping position (stage B), and a doors closed position (stage C), FIG. 6A is a partial cross sectional view similar to that of FIG. 6 but of a more preferred engine of the invention showing a preferred direct exhaust path, FIG. 7 is a side view (from the spark plug side) of the rotary engine of FIGS. 1 to 3.

MODES FOR CARRYING OUT THE INVENTION

Figure 1:
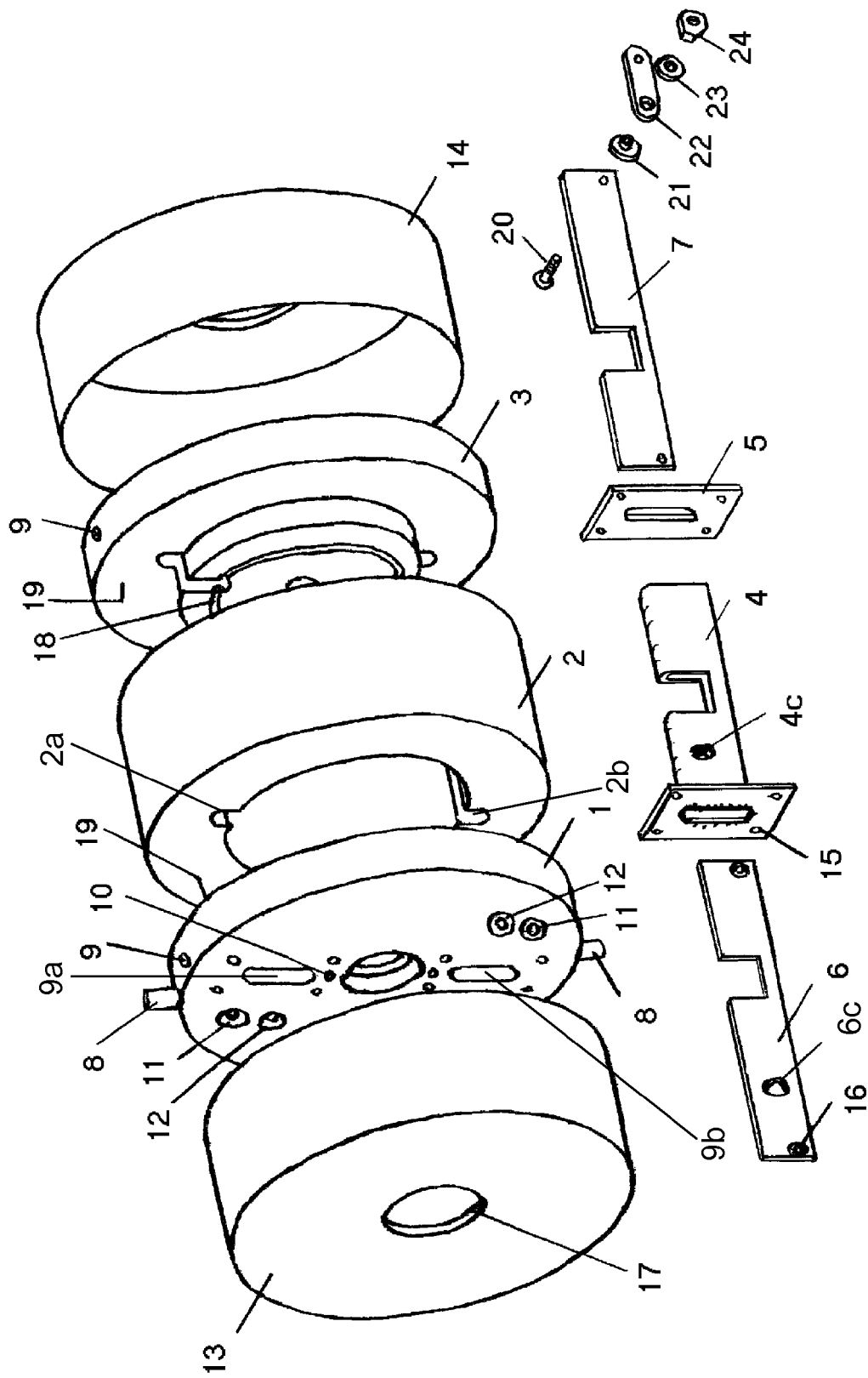
FIG. 1 is an exploded perspective view of the larger components of a rotary engine according to a first embodiment of the invention.

With reference now to the above summarized drawings of FIGS. 1 to 15, a rotary engine embodying the principles and concepts of the present invention and generally designated by the reference numeral 10 will now be described.

Figure 2:
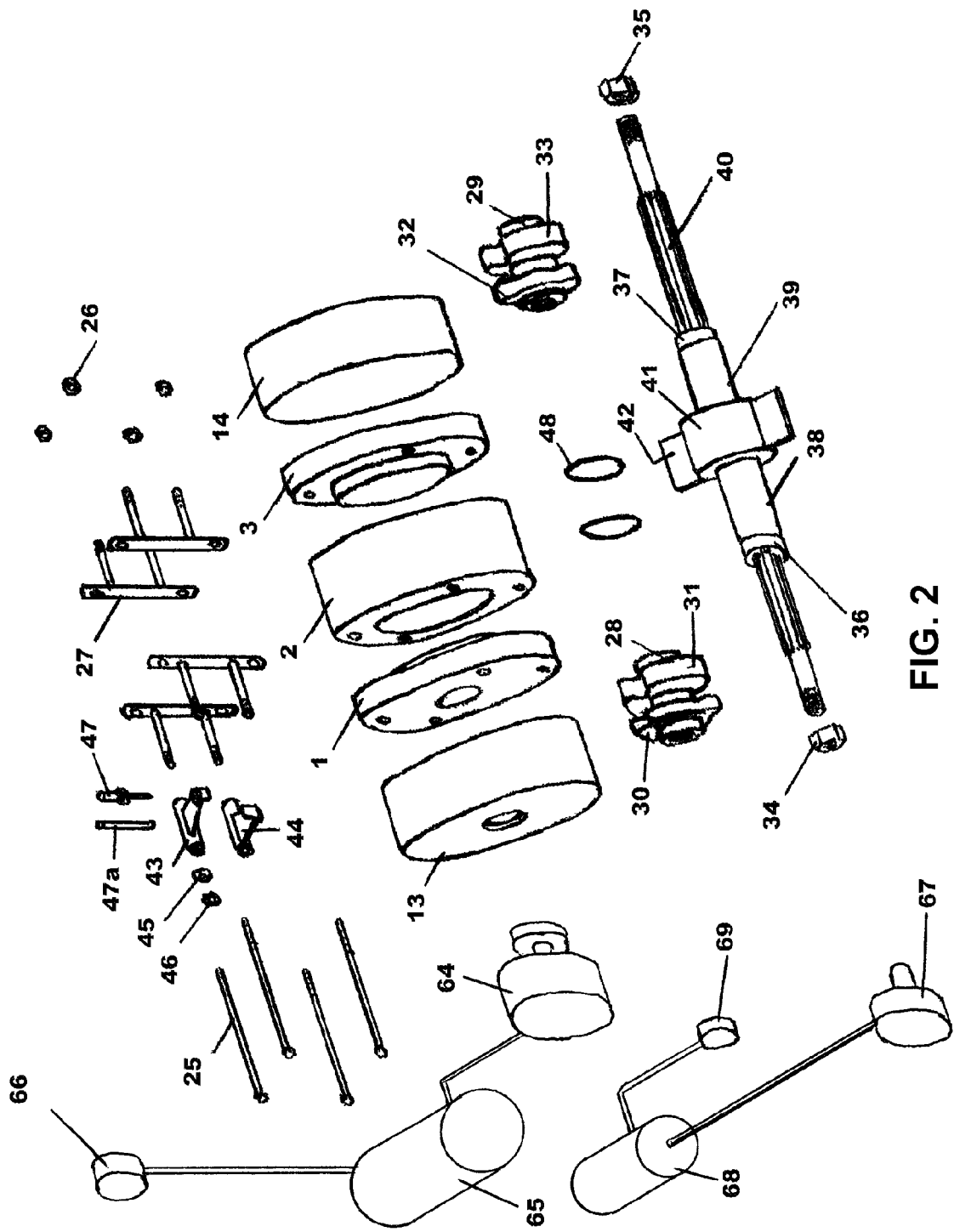
FIG. 2 is a further exploded perspective view showing additional components of the rotary engine according to a first embodiment of the invention.
Figure 3:
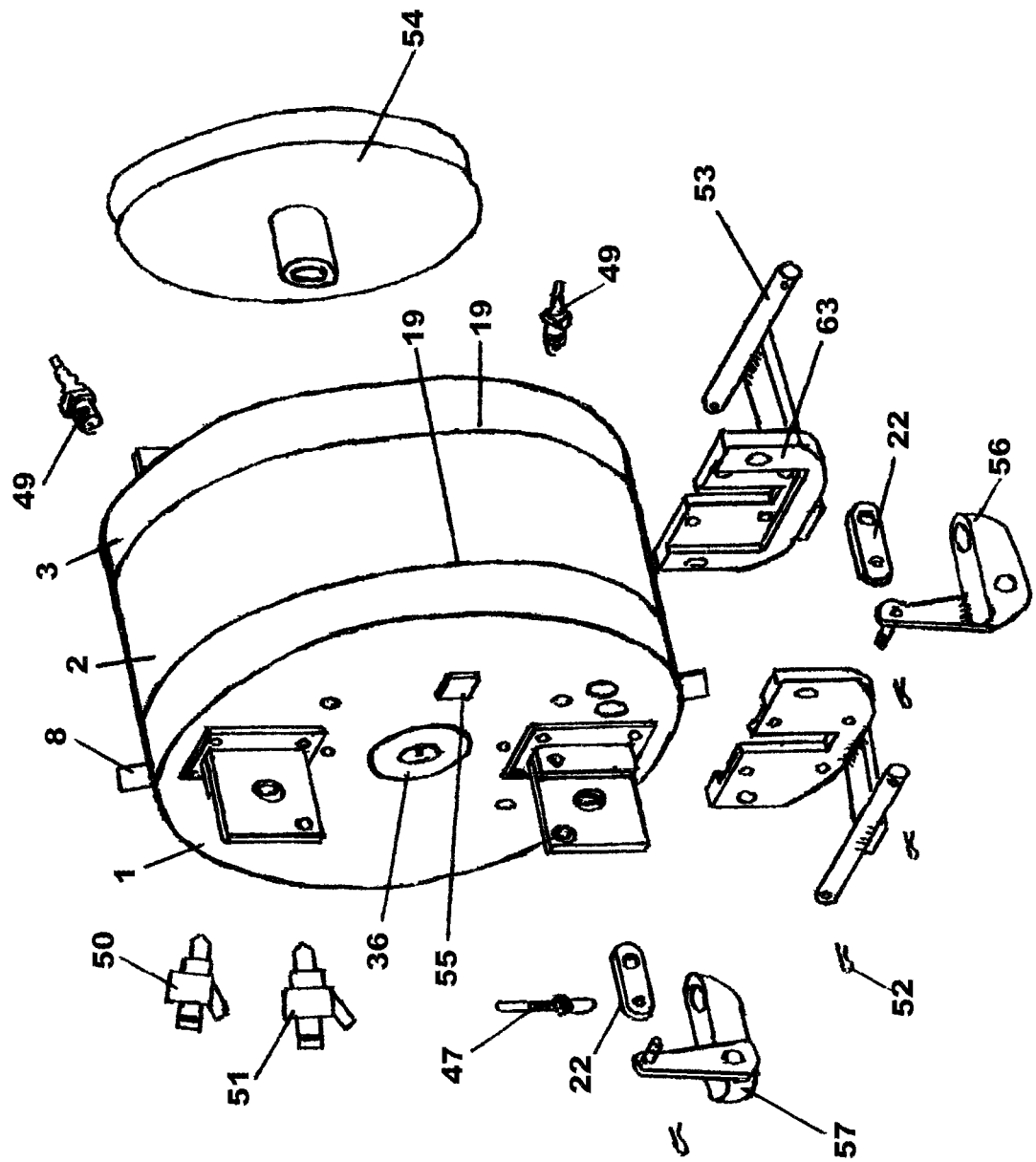
FIG. 3 is a yet further exploded perspective view showing further additional components of the rotary engine according to a first embodiment of the invention.

As shown in the drawings, and especially in FIGS. 1 to 3, the rotary engine (10) generally has a housing (1, 2, 3, 13, 14) through which extends a drive shaft (40) coupled to a rotor (41). The rotor (41) has a main body and a pair of oppositely disposed piston plates (42) extending outwardly therefrom. The main body of the rotor (41) fits between side wall plates (1, 3) and the inside surface of an outer ring (2) of the housing to form an annular chamber. There is minimal clearance between the piston plates (42) and the side wall plates (1, 3) and inside surface of the outer ring (2) such that the piston plates are able to rotate with the drive shaft (40). The piston plates (42) are shaped to fit closely to the walls of the annular chamber so as to provide a substantial seal without being prohibited from rotation. The piston plates (42) thus rotate in the annular chamber along an annular path. The shaft (40) rotates on bearings (36, 37) in the side wall plates (1, 3). Cam assemblies (28, 29) are mounted on the drive shaft (40) external to the housing and are operatively coupled to sliding door plates (6, 7) of door assemblies (4, 5, 6, 7) operating to block and unblock the annular chamber. Each door plate is actuated by rotation of a cam assembly, to which it may be operatively coupled by cam followers, push rods, rocker arms and links or the like, such that a door assembly opens to unblock the annular chamber as a piston plate approaches the door assembly and closes to block the annular chamber after the piston plate has travelled past the door assembly. Movement of the piston plates (42) and door plates (6, 7) is synchronized as the shaft (40) rotates such that the door assemblies open to allow passage of the piston plates. A temporary combustion chamber is formed between each closed door assembly and a piston plate as the piston plate moves away from the door assembly (that is, on the piston plate receding side of the door assembly). There is a fluid inlet (50) for injecting a working fluid such as compressed air (or oxygen) into the temporary combustion chamber, and a fuel inlet (51) for injecting a fuel into the temporary combustion chamber. An ignition source, such as a spark plug (49), is also located in the temporary combustion chamber, and, in a most preferred embodiment, there is a direct exhaust hole (73) from the annular chamber located between the closed door assembly and the piston plate as the piston plate moves towards the door assembly (that is, on the piston plate approaching side of the door assembly). In use, the ignition source ignites a mixture of the fuel and the working fluid within the temporary combustion chamber and the explosion therefrom forces the piston plate along the annular path to thereby rotate the drive shaft and thus power the rotary engine. Pressure from the explosion within the chamber exits the chamber at the end of the power stroke through the exhaust hole (73), and is dumped via an exhaust path to atmosphere, as the piston plate moves towards the next door assembly within the same revolution but before that door assembly begins to reopen. In order to provide timely control of the operation of the fuel injectors (51), the air injectors (50) and the spark plugs (49), there is ideally an electronic ignition control unit (70) which is triggered by sensors (55) that detect the position of the rotating piston plates.

Each door assembly includes two thin flat door plates (6, 7) with slots (6a, 7a) cut into them. The door plates move in opposite directions sliding past one another in close contact. As the door plates (6, 7) slide past one another, their slots (6a, 7a) align temporarily to unblock the chamber. When the slots are aligned, the door assembly is open and the piston plate can travel therethrough (the doors open position). When the slots of the door plates are not aligned, the door assembly is closed and the chamber is blocked (the doors closed position). As mentioned earlier, the fuel/air mixture is ignited in a temporary combustion chamber formed between a closed door assembly and a piston plate as the piston plate moves away from the closed door assembly. The slots in the cooperating door plates do not extend completely across the height of the plates but leave sufficient metal to keep the door plates strong enough to be pushed by the cams without bending out of shape. The slots typically have chamfered or bevelled edges to allow the door plates to slide past each other without interference or collision of the slot edges or with the door carriage edges. The flat surfaces of the door plates have minute dimple (indentation) patterns to retain a low shear lubricating oil that will prevent the door plates frictionally engaging each other from shear action at high speeds.

Door carriage assemblies (4) typically support the door plates (6, 7), and are secured by end plates (5) into slot openings (9a, 9b) in the side wall plates (1, 3) and in slots (2a, 2b) in the outer ring (2). As will be described later, the door carriage assemblies allow for creation (and adjustment) of a gap between the bottom of the door plates (when in the closed position and moving to and from that position) and the outer surface of the rotor (41).

A typical arrangement to fasten a pivot link (22) between a long arm of a rocker assembly (56, 57) and a door plate (6, 7) utilizes a threaded pivot bush (21) which is held fast to the door plate (7) by the countersunk screw (20). There are oil retainer covers (13, 14) for respective side wall plates.

As especially shown in FIG. 2, the shaft (40) is held in place by two bearings housed in the side wall plates (1, 3). On the shaft are the side load angular bearings (36, 37), spacer sleeves (38, 39), and the rotor (41) with its two attached piston plates (42). Nuts are positioned at each end of the shaft to lock all components together. Through bolts (25) bolt the engine together through the cam follower pivot shaft assemblies (27), such that they are sandwiched and held fast against the side wall plates. A typical set of cam assemblies (28, 29) and two types of push rods (47, 47a) are shown. Two gas seal rings (48) fit into slots in the side wall plates.

Figure 8:
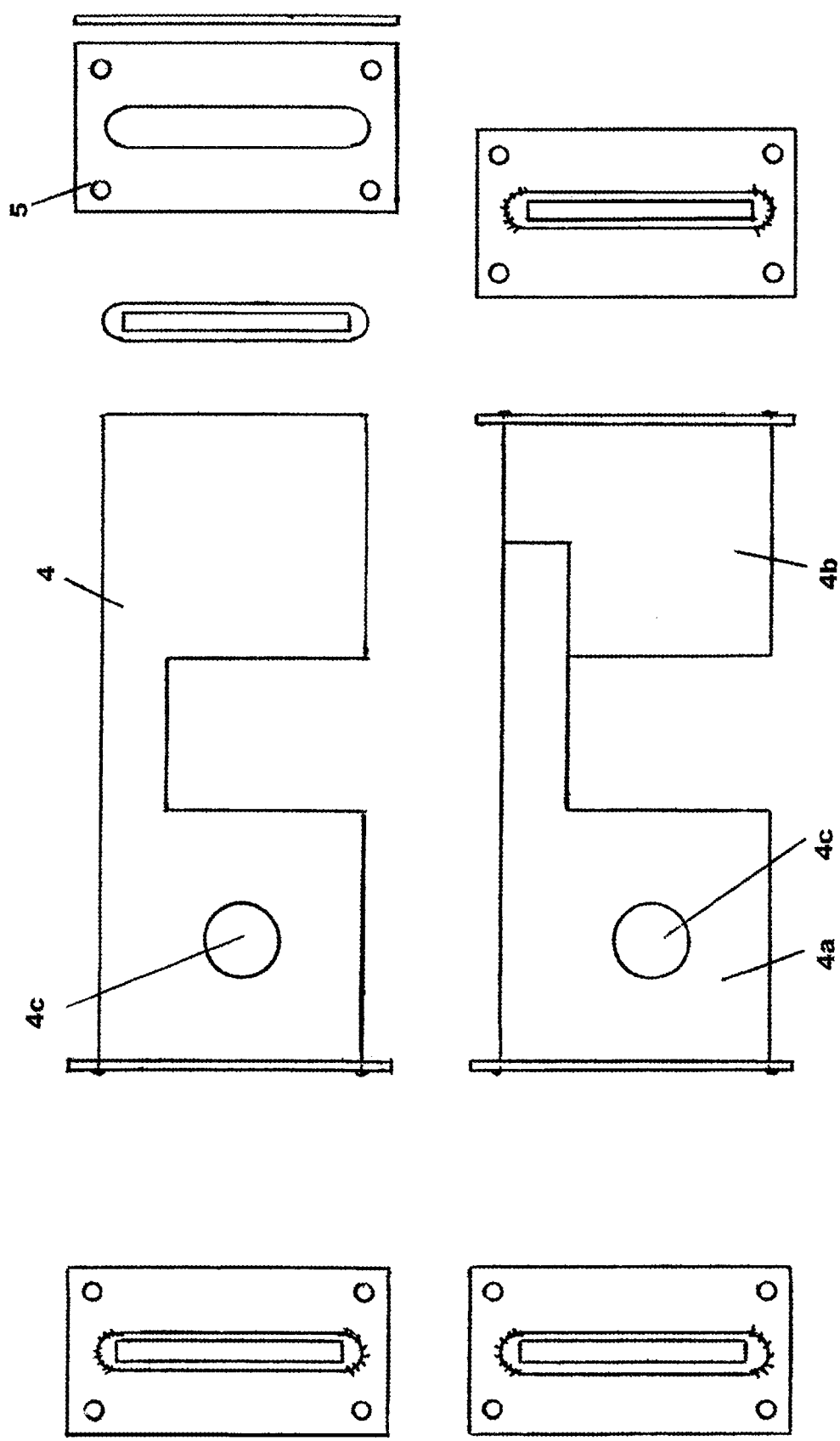
FIG. 8 is a side view of examples of door plates and door carriage assemblies that may be used in the rotary engine of FIGS. 1 to 3.
Figure 9:
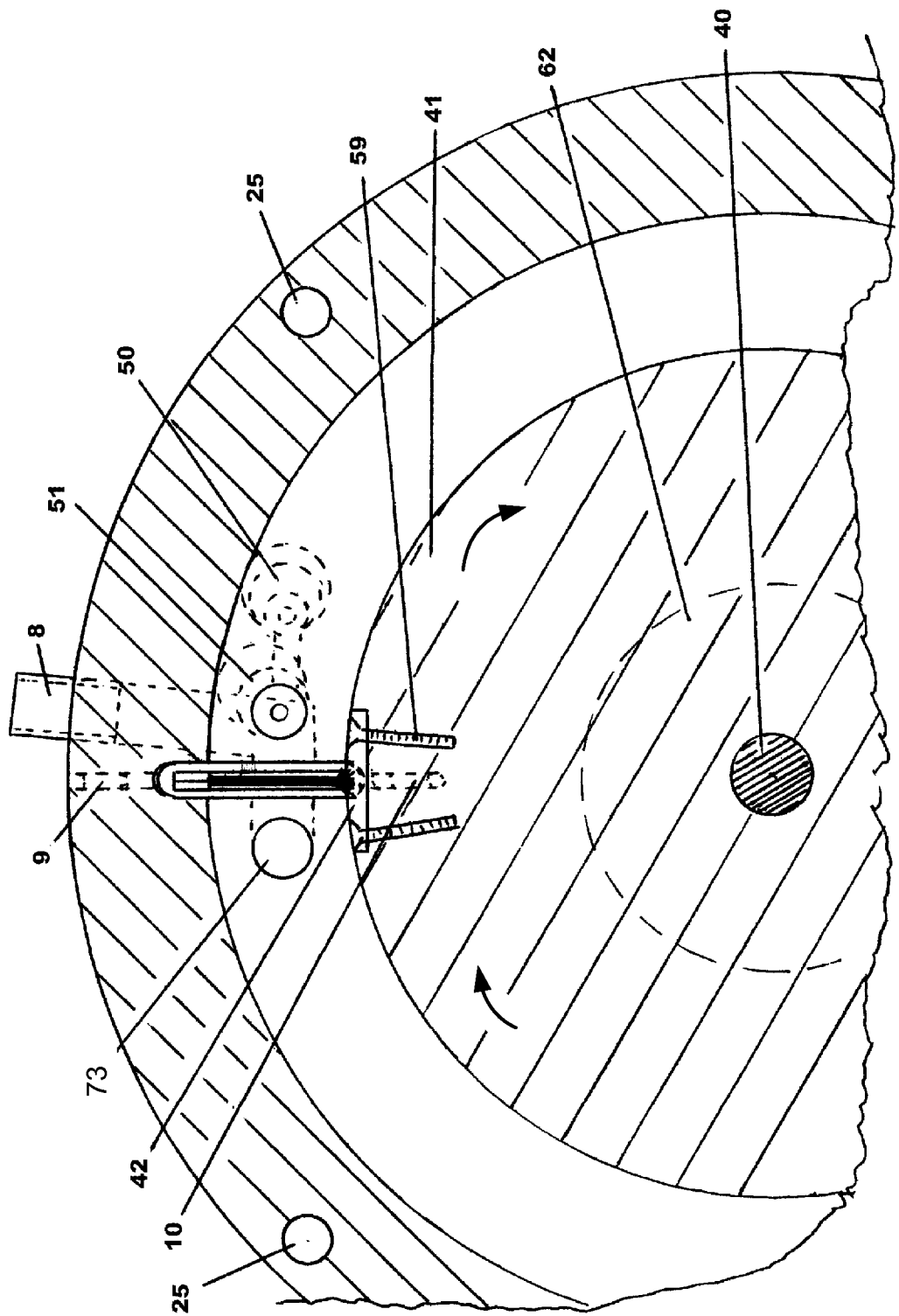
FIG. 9 is a partial cross sectional view taken through section line 9-9 of the engine shown in FIG. 6.
Figure 9A:
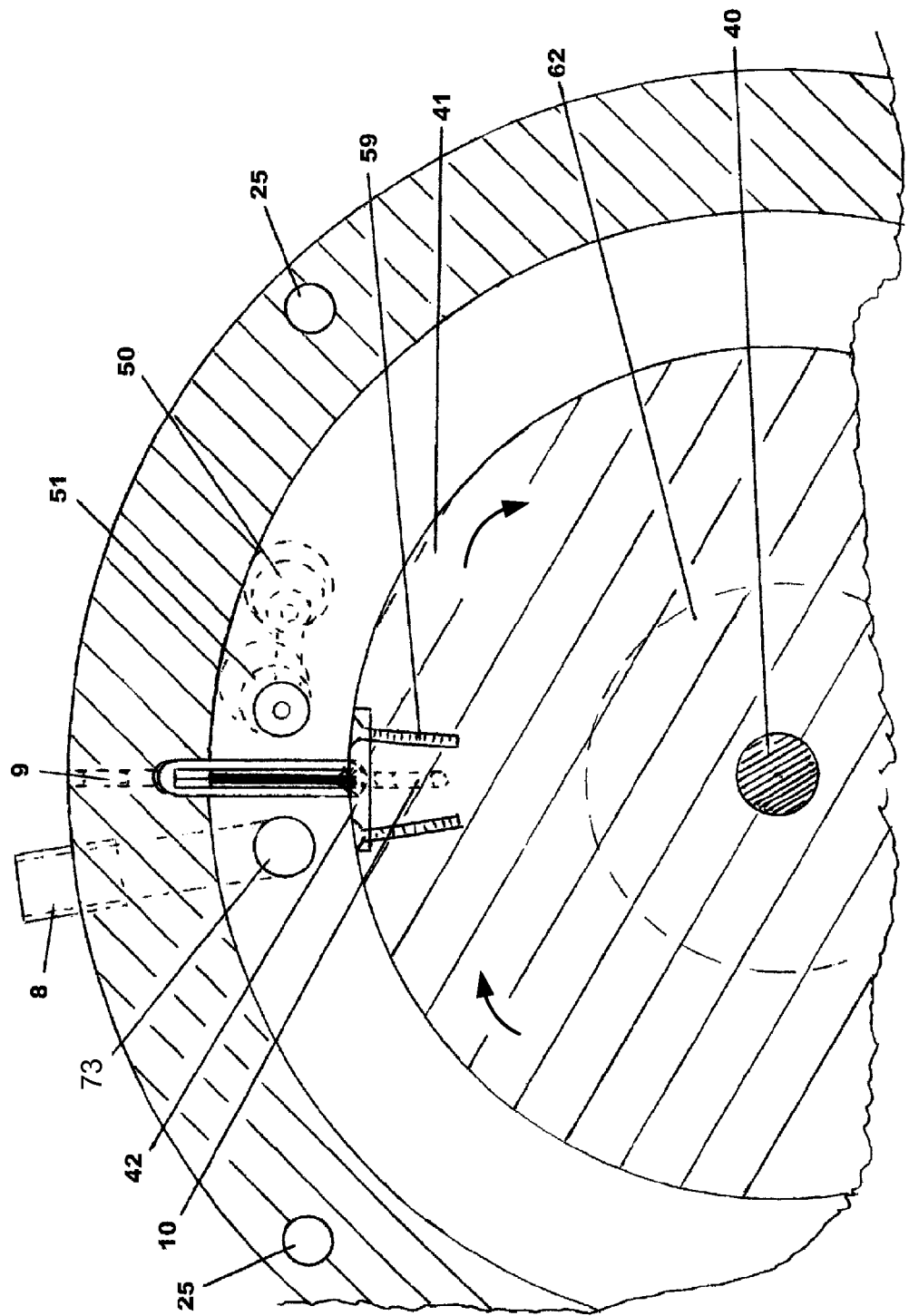
FIG. 9a is a partial cross sectional view taken through section line 9a-9a of the engine shown in FIG. 6A.

Examples of door carriage assemblies (8a, 8b) are shown in FIG. 8. Assembling the rotary engine using carriage assemblies of the type 8a requires the carriages be first inserted into the side wall plate (1), and then the rotor (41) (with piston plates (42) attached) be inserted. The shaft (40) is then positioned within the rotor (41) and fastened via a hub (62). Lastly, the outer ring (2) and side wall plate (3) are fitted with appropriate sealing. When constructing a rotary engine with three or more door carriage assemblies, the assembly 8b should be used. This is because the bottom edges of the carriage assemblies would be smaller in diameter than the rotor (41). When using the assembly 8b, one part (4a or 4b) is attached to side wall plate (1) and the other part is attached to side wall plate (3). Assembly 8b allows easy assembly of the rotary engine and is suitable for use in all embodiments. The exhaust hole (4c) and the hole (6c) through the door plate (6) are used in one form of exhaust path for the engine to be described later.

A gasket (not shown) fitted under each of the end plates (5) of the door carriage assemblies (8a, 8b) prevents chamber gases escaping out of the engine via an adjustment clearance slot in which each door carriage assembly sits. Shims (not shown) may be used between the side wall plates (1, 3) and the outer ring (2) to allow adjustment of the clearance gap from the piston plates (42) and the body of the rotor to the side wall plates. Nuts on the shaft (40) lock the cam assemblies (28, 29), bearing centres and spacers to the rotor so that the bearings enable the shaft and rotor to rotate within the housing. This arrangement also cooperates with through bolts on the periphery of the engine to retain the side wall plates in position against the explosive forces within the temporary combustion chambers, whereby chamber pressure is contained. Ring seals between the rotor and the side wall plates prevent gases escaping towards the bearings, and gaskets (not shown) at the junction of the outer ring and the side wall plates prevent gases escaping out of the chamber. The very close gap between the outer surface of the rotor and the bottom edges of the closed door plates restrict the escape of gases from the temporary combustion chamber (during the power strokes).

Figure 10:
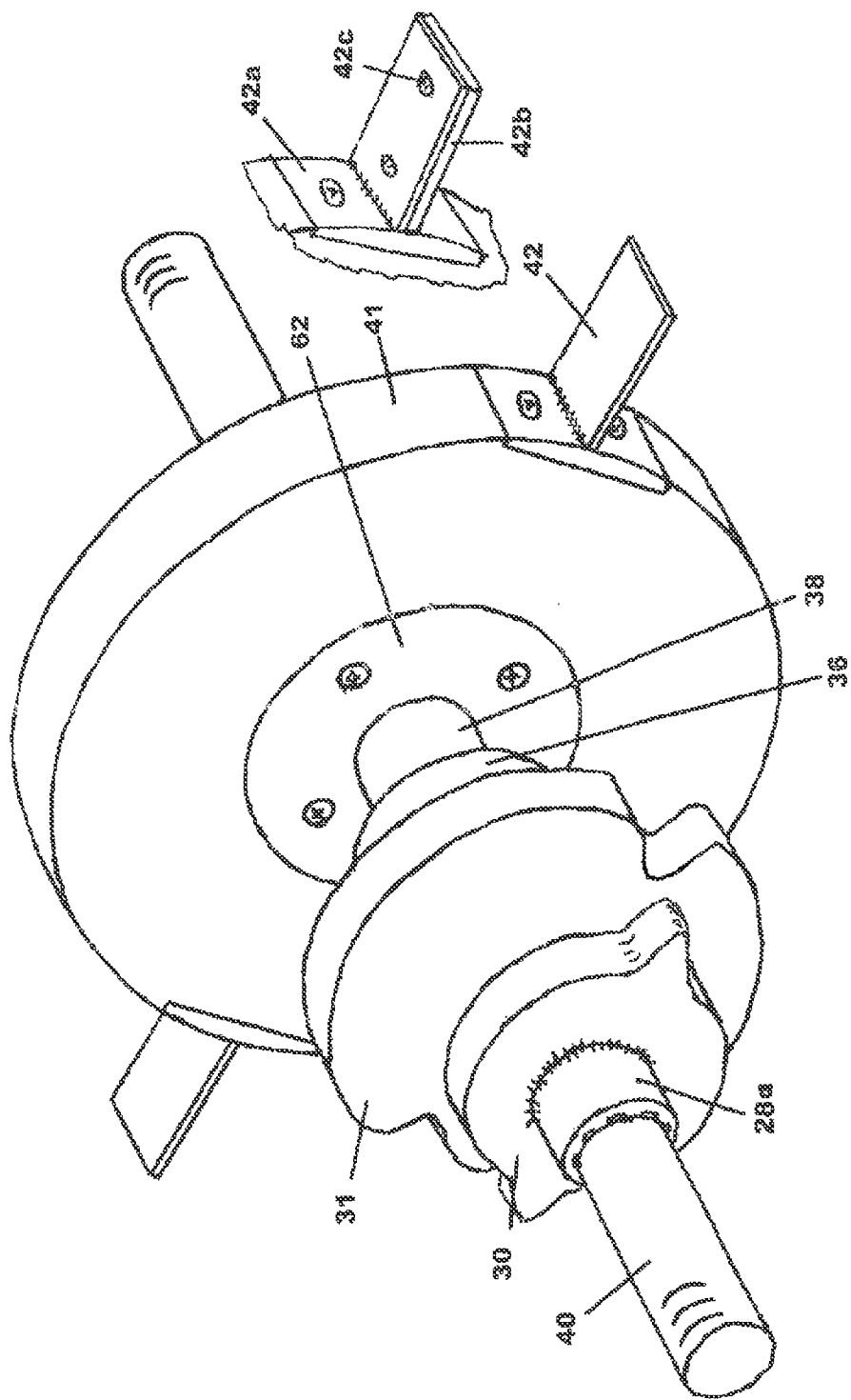
FIG. 10 is a perspective view of an assembly of some of the larger components of the preferred engine of the invention, comprising a drive shaft, a rotor and a cam assembly having aligned inward and outward cam lobes.

An enlarged view of the shaft (40) and the cam assembly (28) is shown in FIG. 10. The cam assembly has an outward cam lobe (30) on the outside and an inward cam lobe (31) on the inside. Both cam lobes (30, 31) are fastened to a sleeve (28a) to form the cam assembly (28). In one example, (see 42a), the piston plate can be fitted with lip seal (42b) secured by rivets (42c). Hub (62) secures the main body of the rotor (41) to the shaft (40).

Ideally, the spark plug (49) and the fuel injector (51) are mounted on opposite side wall plates (1, 3) and are as close to the door carriage assemblies (4) as possible, so as to obtain the highest output power from the engine and give a higher operation cycle to doors opening to doors closed cycle. This is apparent from FIG. 7, which is a view of the spark plug side of the engine.

FIG. 7 also shows the interaction between the cam lobes (32, 33) of cam assembly (29) and cam followers (43, 44). The cam followers engage with push rods (47, 47a) which, in turn, engage with rockers and links to ultimately move the door plates.

Figure 5:
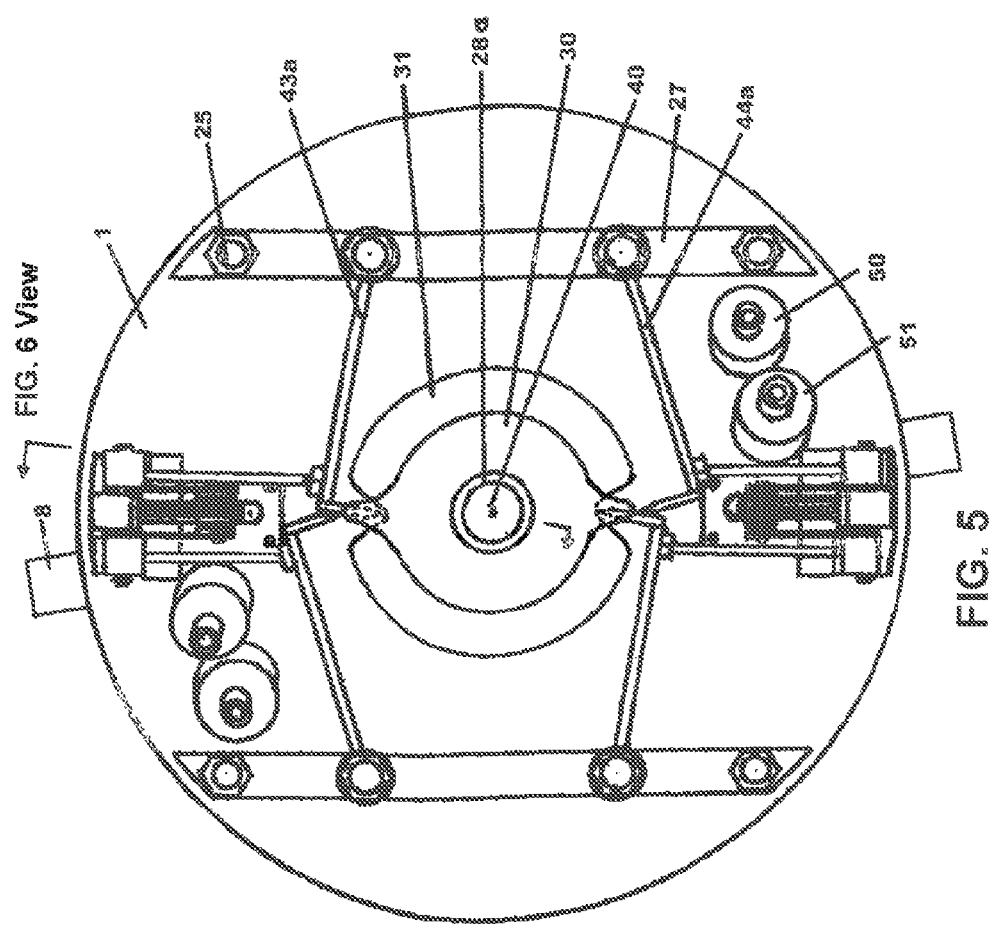
FIG. 5 is a side view (from the injector side) of the rotary engine of FIGS. 1 to 3.

FIG. 5 is a view of the opposite injector side of the engine and shows the positions of the injectors (50, 51), the cam lobes (30, 31) and the cam followers (43a, 44a).

In operation, each door plate (6, 7) is pushed from a start position across the engine in a first direction by movement of an outward cam lobe (30) of a first cam assembly at one side of the housing until it reaches a maximum lobe extension position (door open position) while on the other side of the housing an inward cam lobe (31) of a second cam assembly simultaneously retreats with opposite movement (to maintain a clearance gap), then the inward cam lobe of the second cam assembly pushes back to cause the door plate to move across the engine in a second direction opposite to the first direction and return the door plate to the start position while on the other side of the housing the outward cam lobe of the first cam assembly retreats with opposite movement.

As will be apparent from the above, the door plates (6, 7) of each door assembly are operatively coupled to outward and inward cam lobes (30, 31 or 32, 33) of a respective cam assembly which provides the synchronized movement push forces to operate the door plates. Once the piston plate (42)

passes an open door assembly (the doors open position), the door plates close, a temporary combustion chamber (76) is formed, and the injectors (50, 51) are operated. The fuel injector (51), which is recessed in a passageway that opens into the chamber, is closest to the door plates, and the air injector (50) is located further away in a passageway having an outlet at the recessed location of the fuel injector, the arrangement being such that when the injectors are operated together a swirling mixture of fuel and air is created in the chamber which cools the door plates whilst preheating the mixture. The spark plug (49), which is also close to the door plates but on the opposite side of the chamber to the injectors such that the mixture of fuel and air is deflected off the door plates and surrounds the spark plug, then ignites the fuel/air mixture to cause an explosion in the temporary combustion chamber which provides the force to propel the piston plate (42) forward.

Such ignition occurs simultaneously in each temporary combustion chamber in the engine. As the piston plate approaches the next door assembly, it uncovers the exhaust hole (73) and the pressure in the chamber is released (dumped) therethrough, thereby allowing the door plates (6, 7), from where the piston plate had travelled, to reopen much more quickly and with less frictional resistance than would be the case if the high chamber pressure were still present and applying substantial sideways pressure on the door plates. The removal of such pressure is completed just before the start of the movement of the door plates by the cam assemblies. A major difference between the engine of the present invention and rotary engines of the prior art is that, in the present invention, high chamber pressure on the door plates is removed prior to their movement whereas, in the prior art, high chamber pressure is still on the doors while they are being moved.

The distance between the door plates (6, 7) and the injectors/spark plug is ideally no greater than the distance travelled by the piston plate (42) in the time it takes for the door plates to slide from an open position to a closed position. This ensures that the piston plate has travelled past the location of the injectors/spark plug before ignition so that ignition will be entirely within a chamber effectively sealed at one side by the receding piston plate, and no combustion gases are able to bypass the piston plate via the holes in which the injectors and spark plug are located.

Referring especially to FIGS. 5 and 7, the cammed surfaces of the outward and inward cam lobes (30, 31 or 32, 33) of each cam assembly are in rubbing contact with respective cam follower pads of cam followers (43, 44 or 43a, 44a). Each cam follower pad is at one end of an arm pivotally connected at its other end to a bush fitted on a shaft (27) secured to a side wall plate (1, 3) so as to allow the cam follower pads to sweep arcs in the same plane as the outside surfaces of the side wall plates. Socket pads (60) are also located on the same end of the arm on which the cam follower pad is located, and retain push rods (47, 47a) while allowing some arcing movement of the push rods at the contact point.

The push rods (47, 47a) are in contact with sockets (70a, 70b) in the rockers (56, 57). A short arm of each rocker has a ball socket with cone shaped entry so that the rocker can rotate on a pivot shaft and retain the push rod in the socket. The rockers have arms which change the direction of the cam movements to the same plane as the door movement across the engine. The rocker arms are mounted on pivot bushes and pivot shafts thereof are secured to side wall plates (1, 3), thereby allowing the rocker arms to pivot about the shafts and long arms of the rockers (56, 57) to move in the same plane as the flat surfaces of the door plates, in an arcing movement.

The pivot shafts (53) are positioned across the engine at 90 degrees to the flat side of the door plates and tangential to the outside circumference of the side wall plates. A minimal clearance is maintained between cam assemblies (28, 29) in this push and retreat movement of contact with the cammed surfaces of the engine's left and right side cam assemblies. The ratio of arm lengths and cam shapes takes into account the lost motion and non linear arcing motion from the components in the movement of the doors plates from the cam assembly on one side of the engine to the cam assembly on the other side of the engine. The ratio is selected to retain a safe clearance for the piston plates to pass through the aligned slots of the door plates when the door assembly is open (the doors open position) taking into account the inertia and momentum changes of door plates, links, push rods, rockers, cam followers and working clearances with engine speed changes. The two arm lengths (one short and one long) of the rockers (56, 57) are sized in a ratio to suit the actual cam lift as a mechanical advantage mechanism.

The door plates are pushed by links which pivot on bushes secured to each door plate by countersunk screws through the door plates. The door plates (via the links) are moved by the rocker arms (56, 57) on sleeves mounted on pivot shafts (53) of pivot shaft assemblies (63) that are secured to side wall plates. Radial movement of the push rods (47, 47a) is thereby converted to sine wave movement to push the door plates (6, 7) reciprocatingly across the engine. This sine wave movement ensures that the shock vibrational effects of momentum changes are reduced to a minimum. Furthermore, the arcing movement of the rocker long arms and links at the end of the rocker arm rotation provides a slight downward force on the door plates to maintain a very close gap between the bottom of the door plates and the rotor surface. Also, the length of a link (between the rocker long arm pivot point and the bush pivot point) must be long enough to prevent the link assuming an over-lock position as a result of the arcing of the rocker long arm at too great an angle from the bush pivot point.

The push rods (47) are constructed so as to be adjustable in length, whereas the alternative push rods (47a) are of fixed length. Each end is rounded to fit into the sockets (70a, 70b) to allow movement in an orbital motion. If adjustable length push rods are used, adjusting the lengths of the push rods can obtain the required clearance gaps in the contact of cam follower to cam lobe. If fixed length push rods are used, the cam shapes and sizes, rocker arm lengths, door plates and links need to be more accurate in their construction and shape.

The components shown in FIG. 3 are fitted to the outside of side wall plates (1, 3) and include compressed air injector (51), fuel injector (50), a set of left and right hand rockers (57, 56) and two rocker pivot shaft assemblies (63, 53) Links (22), split pins (52) and spark plugs (49) are also shown. A pulley (54) that may be used to drive the air compressor and the fuel pump is also shown.

Operation of the rotary engine typically results in explosion gases at low pressure from the previous cycle (after dumping pressure to exhaust) being present in the annular chamber in front of the advancing piston plate. These gases are pushed out of the engine through an exhaust path from the exhaust hole (73) in the chamber and released to atmosphere via an outer exhaust port (8) and muffler.

There are two examples of exhaust paths from the chamber that will be hereinafter described. The first, but less preferred, example is an exhaust opening created by alignment of an exhaust hole (6c) in door plate (6) with the slot (7a) in door plate (7) when the door plates (6, 7) are in the doors closed position. When a door carriage assembly is used to support the door plates, the door carriage assembly will also have a hole (4c) that will align with the so formed exhaust opening through the door plates. The exhaust opening created in this way will allow the explosion gases in the chamber and the associated high pressure from the explosion to pass through the exhaust path and exit the engine via the outer exhaust port (8). This is shown in FIGS. 1, 4, 6 and 8. Using the door plates to block and unblock an exhaust path from the chamber helps prevent backfiring or flash back to the exhaust gases when using highly volatile fuels.

The second, but most preferred, example of exhaust path from the chamber (as described earlier) is a permanent exhaust hole (73) direct from the annular chamber located between the closed door assembly and the piston plate as the piston plate moves towards the door assembly (that is, on the piston plate approaching side of the door assembly). In use, the explosion gases in the chamber and the associated high pressure from the explosion directly exit the chamber through the exhaust hole (73) and exit the engine via the outer exhaust port (8). This is shown in FIGS. 6a, 9, 9a, 13 and 15. Such an exhaust path is suitable when using low to medium volatility fuels.

FIG. 4 is a three stage side view of the door plates (6, 7) and the rocker pivot arms (56, 57) that slide both door plates during operation, showing a doors open position (stage A), a door slots overlapping position (stage B), and a doors closed position (stage C), and showing the less preferred exhaust path created by alignment of a hole (6c) in door plate (6) with the slot (7a) in door plate (7) when the door plates (6, 7) are in the closed position.

In stage A, the door plates (6, 7) are in the open position with the slots (6a, 7a) aligned. In stage B, the door plate (6) with its exhaust hole (6c) is moved to the right while the cooperating door plate (7) is moved to the left, to reach an intermediate or overlapping position of the door plates where the slots are not aligned and the door plates now close off the chamber. In stage C, the door plates have reached the fully closed position with the hole (6c) in door plate (6) aligned with slot (7a) in door plate (7) to allow the pressurized exhaust gases to escape through the exhaust port (8). This is the position that the door plates assume for the majority of the engine's rotation.

Figure 4A:
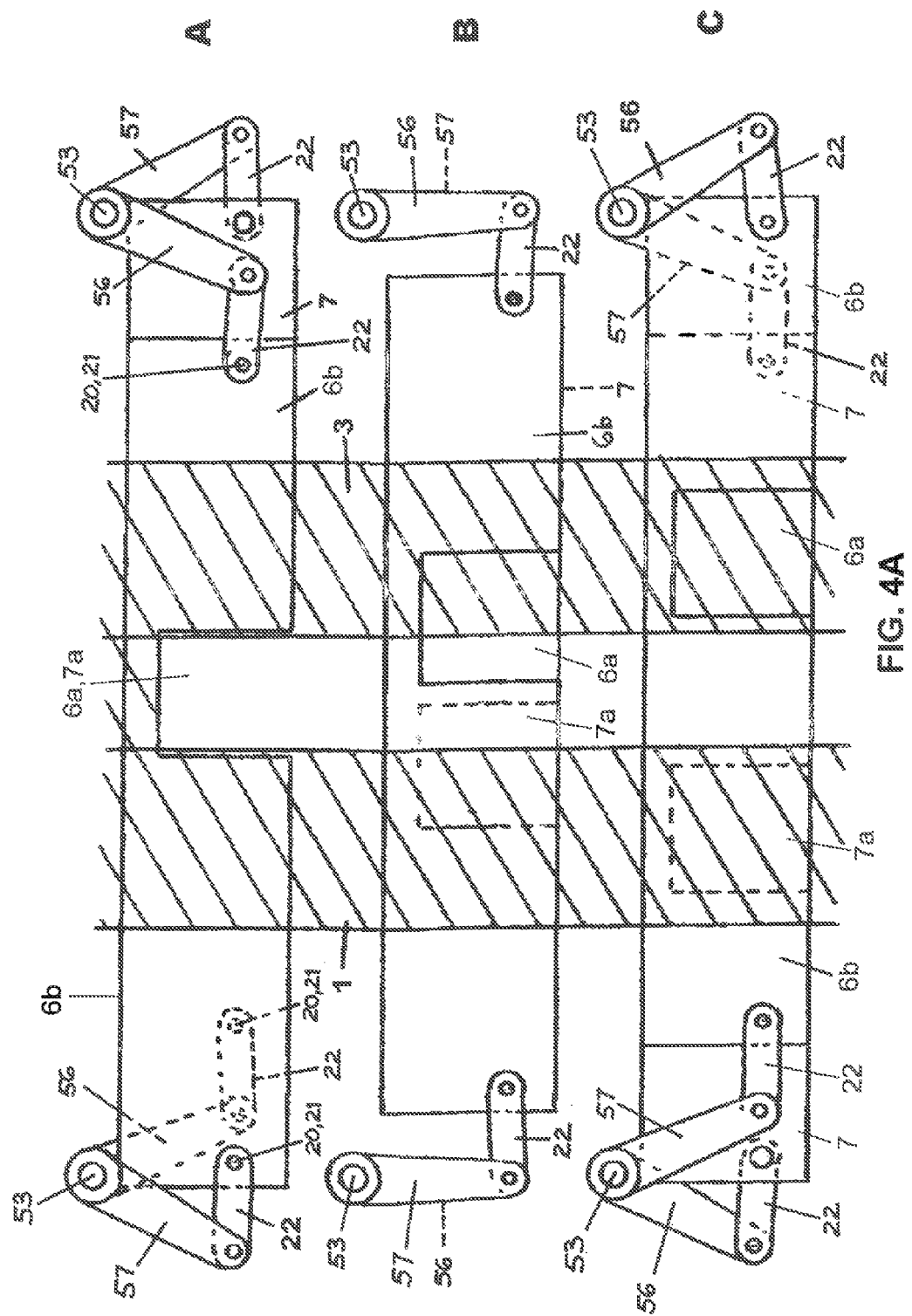
FIG. 4a is a three stage side view of slightly different door plates (to those shown in FIG. 4) of the rotary engine of FIGS. 1 to 3 during operation, showing a doors open position (stage A), a door slots overlapping position (stage B), and a doors closed position (stage C)

FIG. 4a is a three stage side view of door plates (6b, 7) and the rocker pivot arms (56, 57) that slide both door plates during operation, showing a doors open position (stage A), a door slots overlapping position (stage B), and a doors closed position (stage C), the door plates not creating an exhaust path but the exhaust path provided by a permanent exhaust hole from the annular chamber. As the piston plate approaches the door assembly, it uncovers the exhaust hole (73) and the pressure in the chamber is released (dumped) therethrough.

Figure 6:
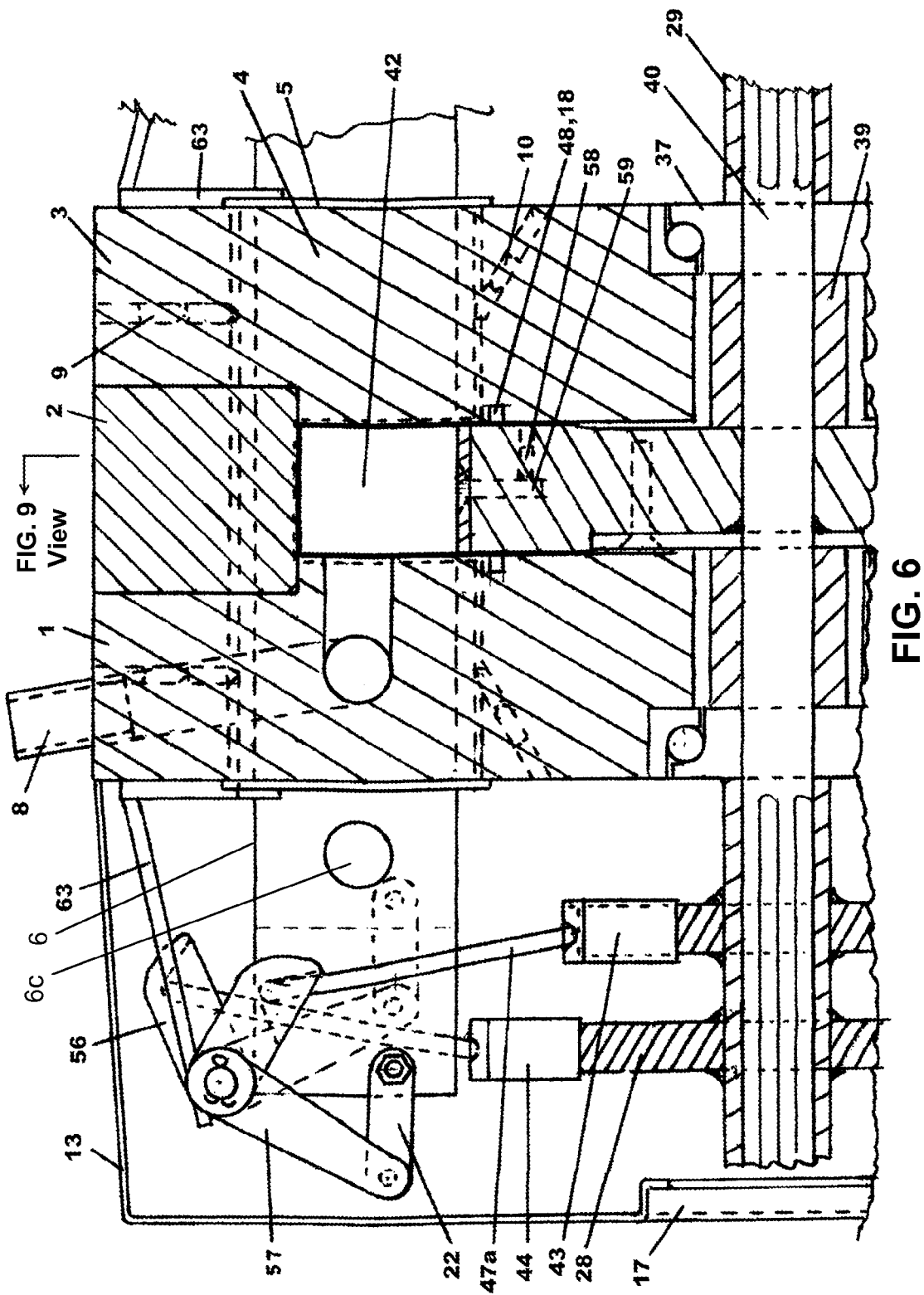
FIG. 6 is a partial cross sectional view taken through section line 6-6 of the engine shown in FIG. 5.

FIG. 6 shows the positions of the cam lobes (30, 31) on the cam assembly (28), the cam followers (43, 44), the fixed length push rods (47a) and the rockers (56, 57) on pivot shaft assembly (63), at the moment the piston plate passes through the aligned slots of the door plates. The exhaust port (8) is shown blocked by the door plates that are in the open position. Adjustment set screws (9, 10) lock the door carriage assembly (4) such that there is a minimal clearance between door plates and rotor. The position of the gas sealing ring (48, 18) is also shown. As will be apparent, FIG. 6 only shows the arrangement of the top left side in detail, but the top right side cam assemblies and rockers are similar, as are the lower left and right side cam assemblies and rockers.

The outward and inward cam lobes (30, 31) create a fast rise and fall which is required to move the doors. It also sets the dead band in the power stroke of the rotor's rotation. The dead band is the period when the door plates are moving. Such fast door movement is only possible because the force required from the door movement by the dumping of chamber pressure. (There is an increased force on the cam lobes imposed by the mechanical advantage ratio of the rocker arm lengths converting cam lobe throw to door movement across the engine). A dead band to power stroke ratio of 1:10 is possible with this engine.

The sinusoidal pattern of movement of the door plates across the engine is the result of the arcing movement of the cam followers (43, 44) rubbing against the required shape of the cammed surfaces of the cam lobes. Such door movement reduces wear to the cammed surfaces and to the pads (61) of the cam followers, and noise and vibration from movement of the door plates and cam assemblies is minimized. Vibration is also minimized because the door plates (6, 7) slide in opposite directions to each other across the engine, and so the vibrational force vectors cancel each other out.

Figure 10A:
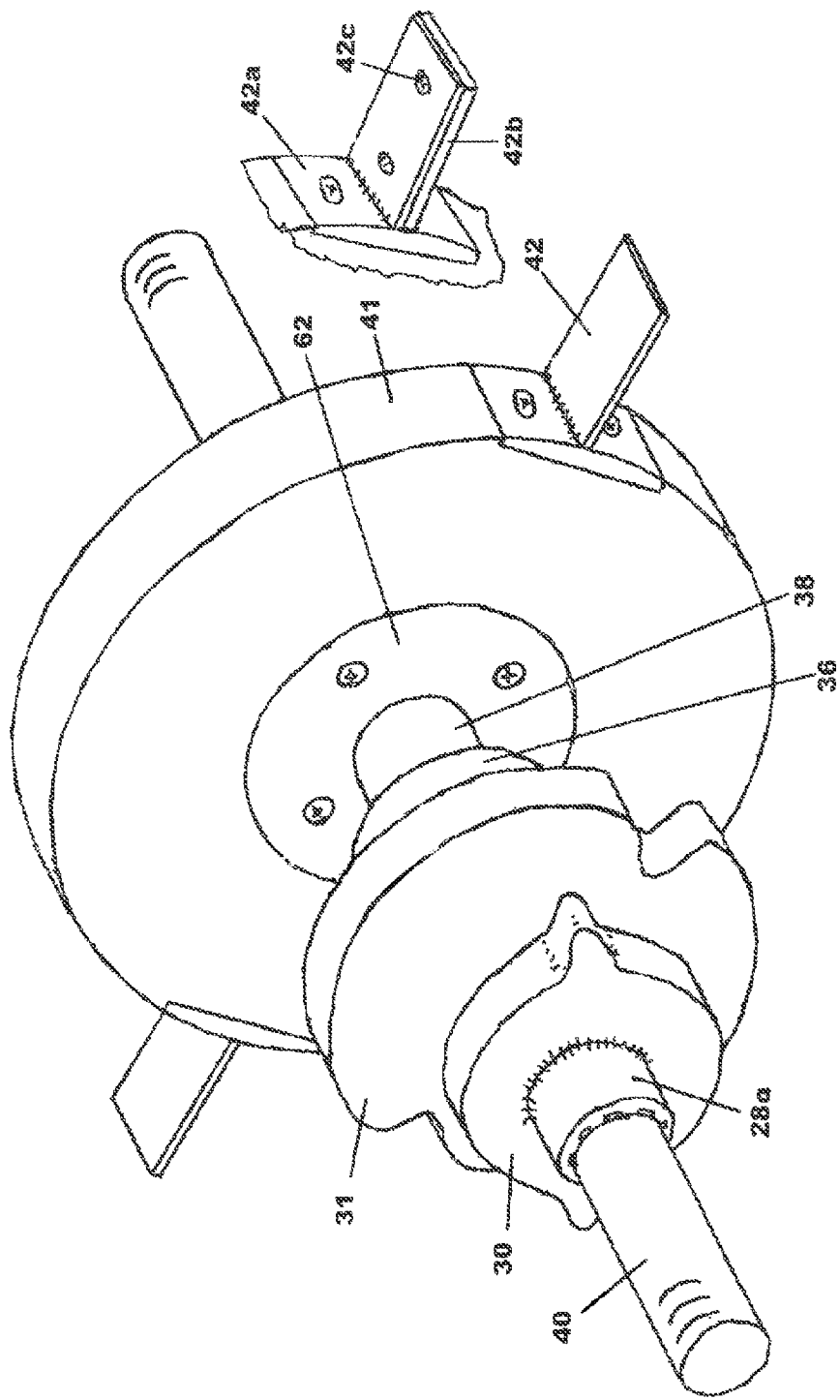
FIG. 10a is a perspective view similar to that of FIG. 10 but showing the cam assembly having offset cam lobes.

The cam lobes (30, 31) can be offset (as shown in FIG. 10a) so that the cam followers (during their arcing movement) and push rods do not collide with other nearby components. As will be apparent from the above, the number of lobes on each cam assembly is dependent on the number of piston plates used on the rotor body.

The rotary engine may use a variety of fuels and working fluids, such as LPG and compressed air, petrol and compressed air, or hydrogen gas and oxygen gas. The side wall plates (1, 3) and the outer ring (2) and rotor (41) may be constructed of ceramic materials to enable operation of the engine at higher running temperatures.

Figure 11:
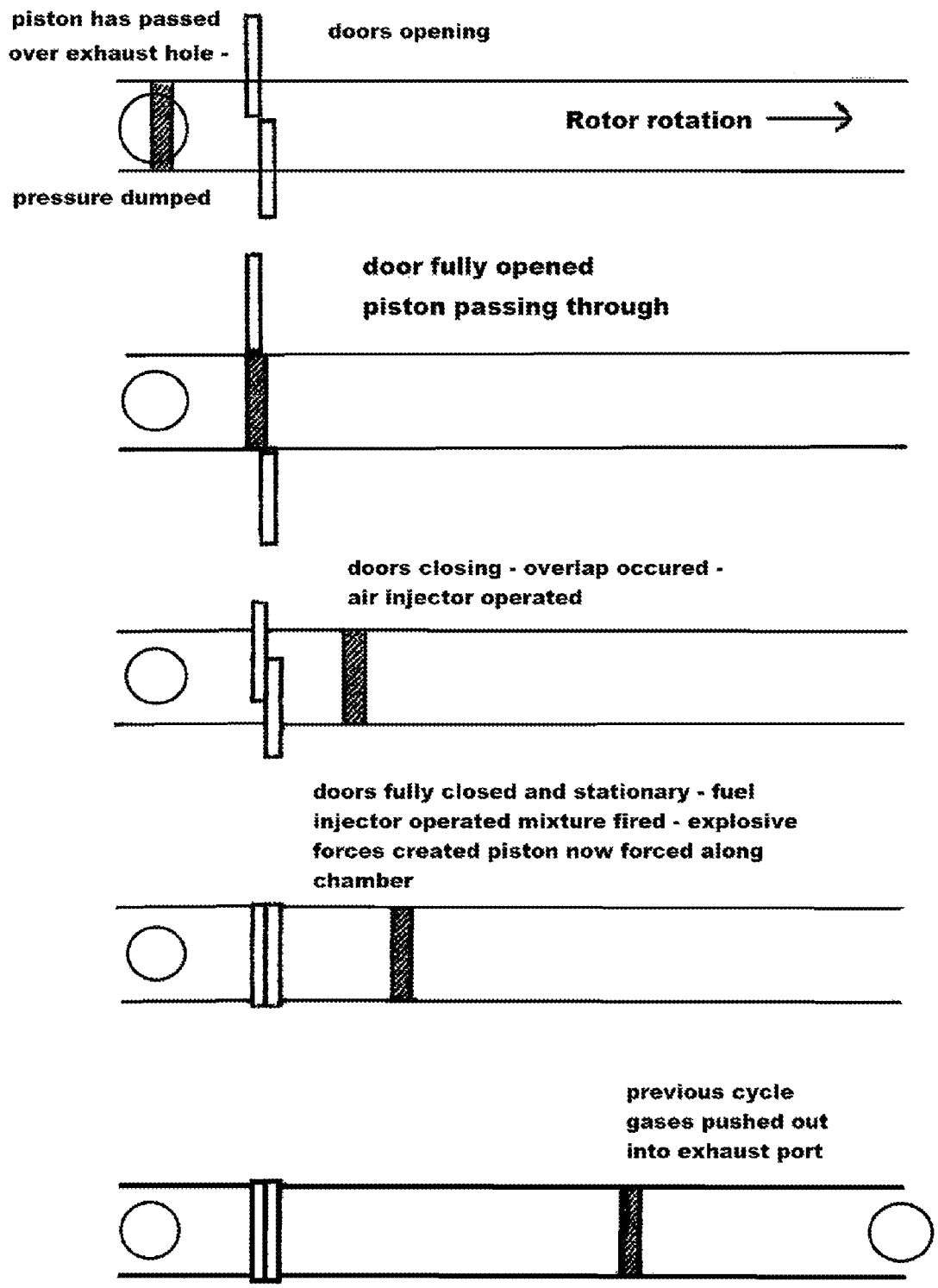
FIG. 11 is a five stage top view showing the direct exhaust hole, the combustion chamber and door plates of the preferred rotary engine of the invention during operation, and showing the progression of the piston plate in comparison to the position of the direct exhaust hole and door plates.

The input and compression strokes, which are normal to most prior art engines prior to ignition, are not required with this rotary engine, as the fuel and the working fluid are injected under pressure from pressure tanks or accumulator vessels (65, 68) (see FIG. 2). An air compressor (64) feeds compressed air into the air pressure tank (65) which feeds the air to the air pressure regulator (66) which controls air pressure to the air injectors. A fuel pump (67) supplies fuel under pressure to a fuel pressure vessel (68) which supplies the fuel to the fuel pressure regulator (69) which controls the fuel pressure to the fuel injectors. Thus, the compression of the fuel and the working fluid is not a direct function of this engine, but occurs separately, out of synchronization with the operation of the engine. If not supplied by pressure tanks (65, 68), the power to compress the fuel and the working fluid can come from the rotation of the drive shaft, which pre-charge the pressure tanks FIG. 11 is a top view (flat land presentation) of the combustion chamber and door plates over five stages (A, B, C, D and E) of the operation of the engine, showing the progression of the piston plate in comparison to the position of the door plates. Stage A shows the piston plate progressing to the right approaching the door plates that are beginning to open. Stage B shows the piston plate passing through the opened door plates. Stage C shows the door plates closing, and at this point the injectors operated. Stage D shows the door plates fully closed and the ignition of gases occurs to move the piston plate along the chamber. Stage E shows the piston plate having passed the door plates, and the spent exhaust gases left in front of the piston plate from the previous cycle of the forward piston plate are pushed out of the chamber through the open exhaust hole in the chamber ahead.

Figure 12:
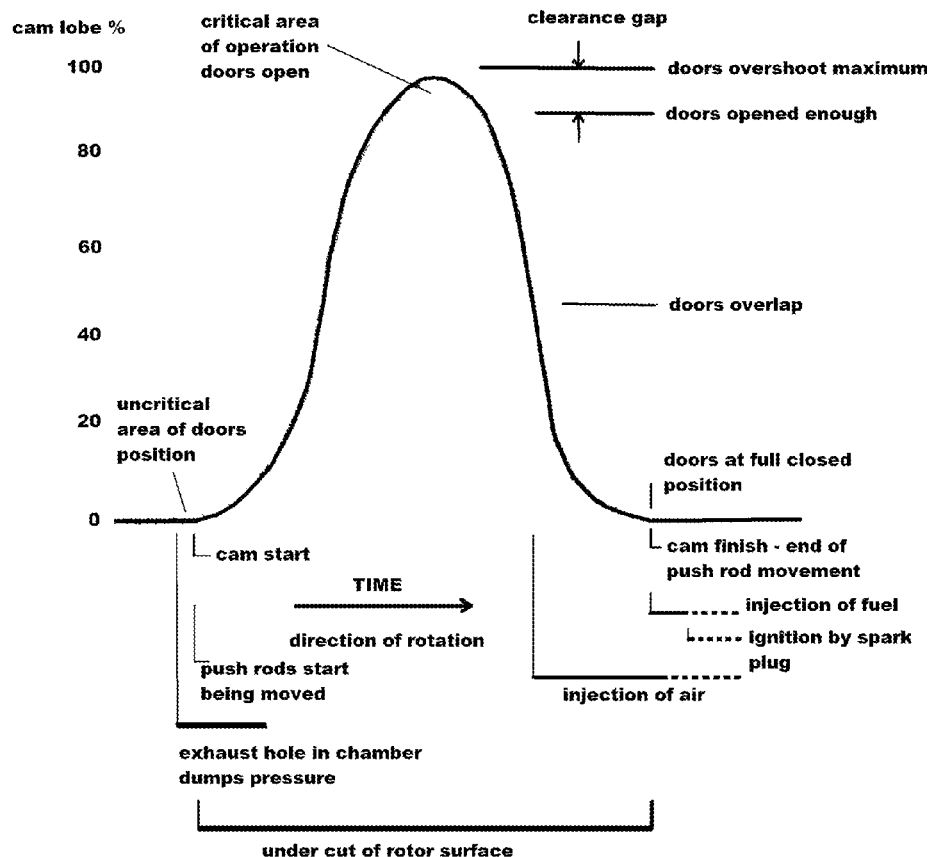
FIG. 12 is a graphical representation of the time relationship between the inward and outward cam lobe movements and the position of the door plates, and injectors and spark plug ignition.

FIG. 12 shows the time relationship of push of an outward cam lobe moving a door plate as the outward cam lobe rotates on the shaft until it reaches the critical passage of the piston plate passing through the slot in the door plate (top of sine wave). The door plate is then moved to a closed position by the push of the inward cam lobe on the other side of the engine. The other plate of the door assembly similarly moves in the opposite direction across the engine. The air injectors start operation after door plate overlap occurs. When the door plates are in the doors closed position, the fuel injectors are operated. When correct mixture injection is completed, the spark plug is operated to ignite the mixture.

The operation cycle is the movement of the piston plate from the location of the exhaust hole (73) to the next exhaust hole ahead in the annular chamber. The dead band is the movement of the piston plate forward from the exhaust hole (73) to the point of ignition (see FIGS. 11 and 12). The power stroke is the movement of the piston plate starting at the ignition point in the chamber and ending when the piston plate reaches the location of the exhaust hole in the chamber (at which point the pressure driving the piston plate is relieved through the exhaust port, taking pressure off the door plates as they start to be moved open). A ratio of 1:10 dead band to power stroke within the operating cycle is possible with this engine. The long power stroke also enables this engine to have a more continuous exhaust flow stream.

Figure 13:
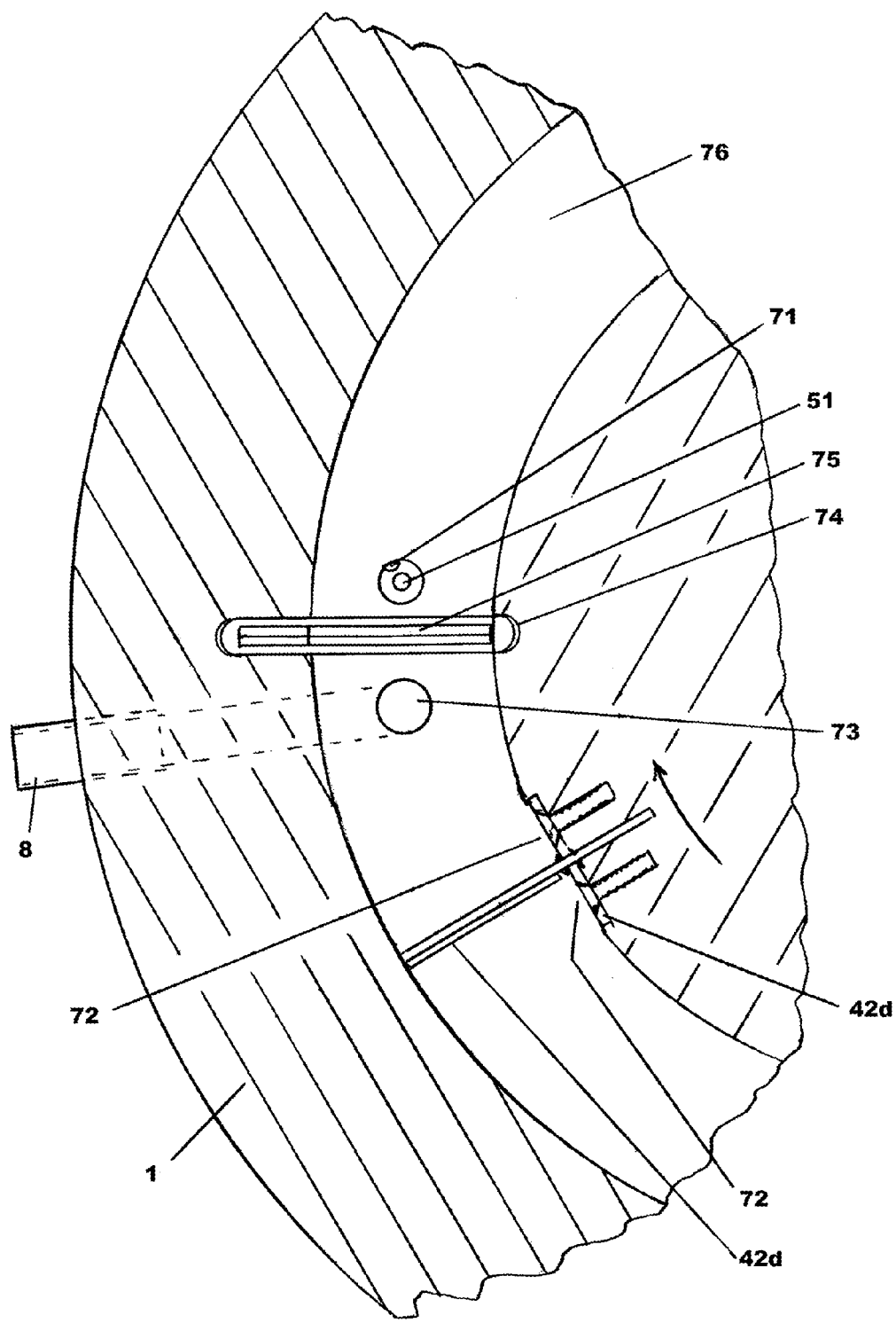
FIG. 13 is a partial cross sectional view similar to that of FIGS. 9 and 9a but showing a piston plate partly embedded in an undercut area of a rotor surface.
Figure 14:
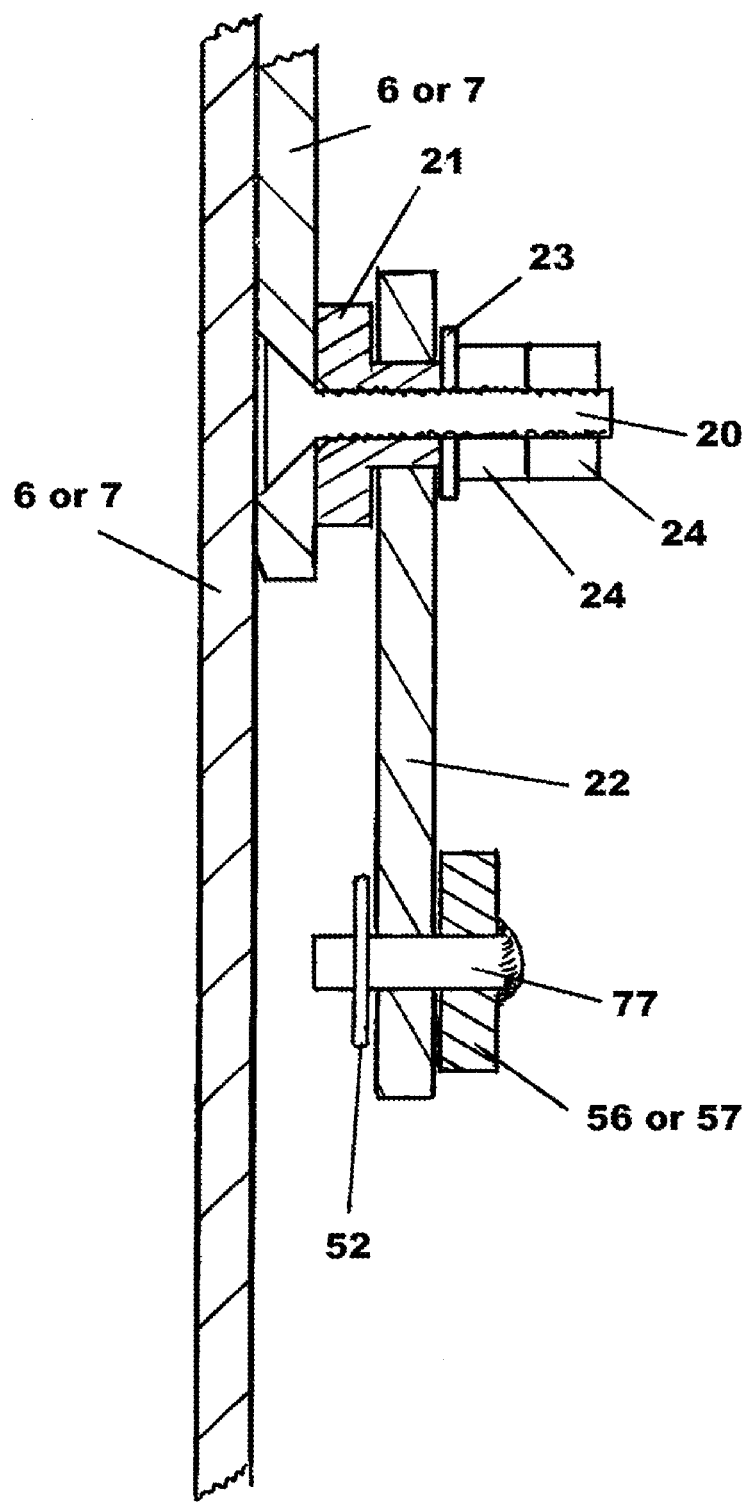
FIG. 14 is a partial cross section view of the door plates of the preferred engine of the invention showing a linkage arrangement between one door plate and a rocker arm assembly.
Figure 15:
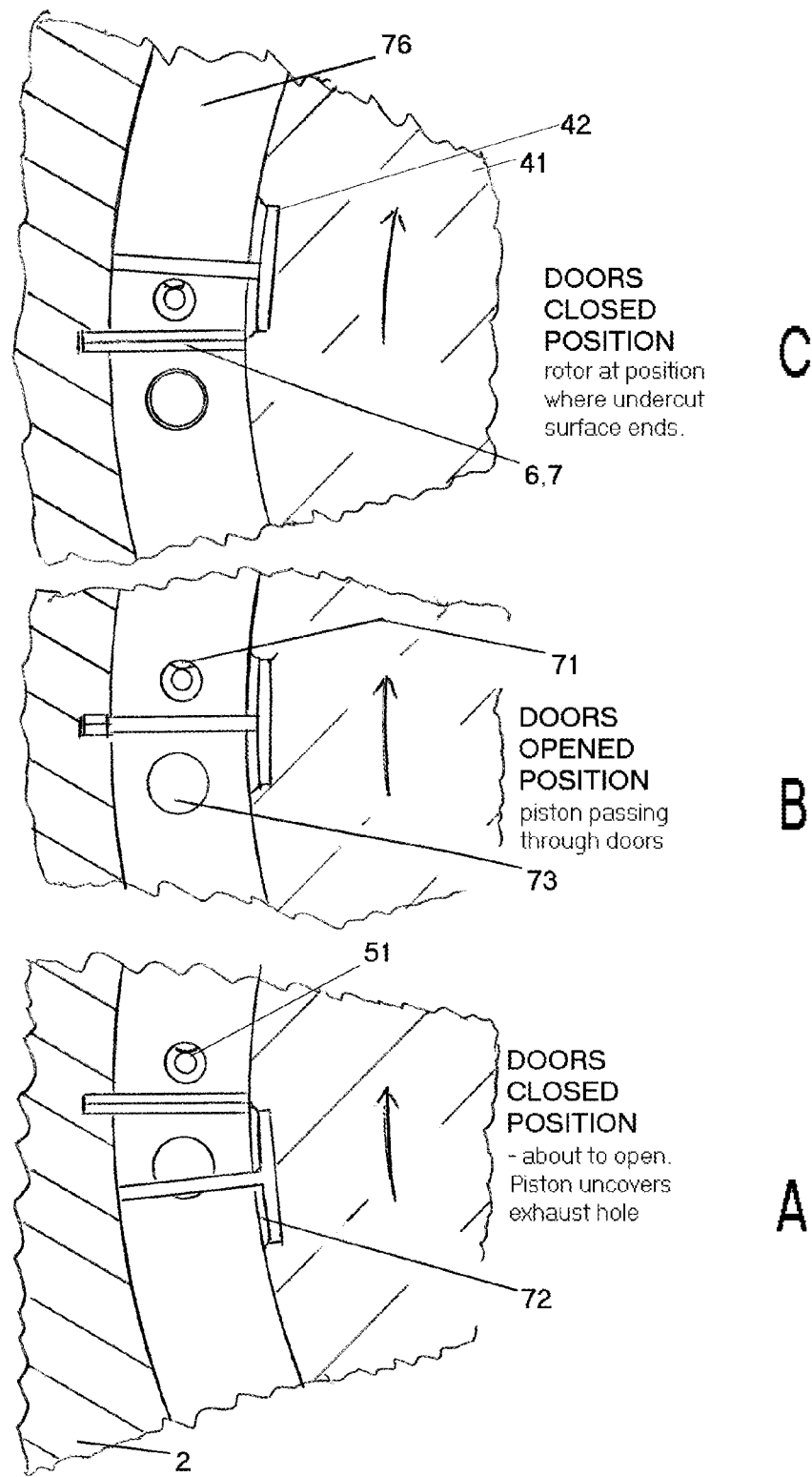
FIG. 15 is a three stage side view of the combustion chamber, door plates, direct exhaust hole and piston plate of the preferred rotary engine of the invention during operation, showing a doors closed position (stage A), a doors opened position (stage B), and a doors closed position (stage C), and showing the progression of the piston plate in comparison to the position of the door plates and direct exhaust hole.

The engine power is produced radially and balanced, with little force applied to the bearings, so a smooth operation with little drag is the result from this high output torque engine. The torque of the engine is largely dependent on the total surface area of the piston plates and the mean effective pressure of the engine. It would be more advantageous to have taller piston plates than wider piston plates, because wider piston plates require the door plates to move a greater distance across the engine whereupon the bottom edges of the door plates (when in the closed position) are not directly supported by the door carriage assembly and so may experience a greater deflection, whereas taller piston plates require door plates with shorter bottom edges that require less support, and thereby experience little deflection. The chamber mean radius would also increase with taller piston plates, leading to greater output power and torque. The limit of efficiency in the height of piston plates is set by the extra stress imposed on the base of the piston plate (where it is attached to the body of the rotor) and the tendency of taller piston plates to flex. As shown in FIG. 13, these limits can be addressed in part by strengthening the piston plate (42d) by partly embedding the piston plate in an undercut area of a rotor surface (to be described in more detail later). The increase in the mean radius of the chamber produces more output power and torque for the same total area of piston plate used. Similarly, increasing the mean effective pressure of the engine greatly increases the output power and torque of the engine. Increasing the number of the piston plates used in the engine would increase the torque and output power, but effectively increase the speed of movement of the door plates. The maximum RPM of the engine would be reduced because of the increase in door speed required, and this is what limits the output specifications of the engine. The only way to increase the maximum RPM (and ensure that the door speed limit is not exceeded) would be to change from the long power stroke (to dead band) of this engine to a shorter power stroke. However, this, in turn, reduces engine efficiency, and the engine will no longer have the advantage of being a small engine that efficiently produces a high torque over a full range of the revolutions of the engine.

Because of the production by this engine of a very high torque over a full revolution at full throttle, a vehicle powered by this engine would require less gearing in the drive chain than would be required for other engines.

Throughout a rotation of the engine, the door plates are mostly in the door closed position, thus keeping the dead band of each stroke as short as possible.

The number of strokes in one revolution of the engine is dependent on the number of piston plates used on the rotor.

The engine may be operated in a pulse mode, where one or more further smaller explosions (resulting from smaller quantities of fuel and working fluid being injected and ignited) are spaced apart in time over a power stroke to obtain the power output. In this mode, the second pulse would self ignite by the temperature and pressure already in the combustion chamber or by the ignition of the spark plug. This mode of operation would be suitable for engines constructed of ceramic materials which generally are more brittle than conventional construction materials. Ceramic materials also enable the engine to operate at higher temperatures than other rotary engines, thus raising the thermal efficiency of the engine and lessening the need for cooling compared to rotary engines made of metal.

The minimal contact between rotating components within this engine allows the use of ceramic construction materials without concern over friction as is normally associated with non-metal construction materials.

FIG. 13 shows a piston plate (42d) partly embedded in an undercut area (72) of the surface of the rotor. There is a space that will serve as a temporary combustion chamber (76) on the receding side of the door assembly (75) and there is a direct exhaust hole (73) on the approaching side of the door assembly (75). While the door plates are closing, at about the middle of their sliding movement, the door slots reach an overlapping position (Stage B of FIGS. 4 and 4b) and start to seal off the combustion chamber, at which point a vacuum starts to develop in the chamber. However, the undercut area (72) of the rotor surface would allow exhaust gases to be sucked underneath the bottom edges of the closed door plates and start to contaminate the chamber. However, switching on the air injector (51) by the control unit (70) will then flush any residual exhaust gases back under the closed door plates and into the preceding chamber on the approaching side of the door assembly where the exhaust gases will be flushed out through the exhaust hole (73) to atmosphere. Therefore, the use of the undercut area (72) of the rotor surface on the side of the piston plate away from the direction of rotation allows contaminating exhaust gases to be flushed out of the temporary combustion chamber (and out of the engine through the exhaust pipe(s)) before the injection of fuel. Fuel injection occurs after the undercut area has passed the door plates, and when a sufficient fuel/air mixture is injected the mixture is ignited. The undercut area on both sides of the piston plate also provides a greater clearance or gap between the bottom of the door plates during their fast opening and closing movements and the rotor body outer surface, thereby preventing possible collision therebetween. In the absence of such an undercut area of the rotor surface, the flushing out of exhaust gases is not performed and slight negative pressures act on the injector side of the door assembly during movement of the door plates after overlap of the door plates has occurred.

In continuing its movement, when the piston plate reaches the receding edge of a recess in which is located the spark plug (49) (at which time the undercut area of the surface of the rotor on both sides of the piston plate is no longer underneath the bottom of the closed door plates), the chamber is sealed off. The fuel injector (50) is then switched on by the control unit (70), and when a sufficient fuel/air mixture has been achieved, the spark plug (49) ignites the mixture to force the piston plate forward through the annular chamber. The pressure and temperature rises to a peak as the fuel is consumed. Any pockets of fuel/air mixture not ignited by the spark plug are then subsequently ignited by the sharp rise in temperature and pressure. Even though the piston plates on the rotor are free to move, the inertial momentum of the rotor (and any flywheel attached to the shaft) will not allow quicker rotation of the rotor, and this causes the sharp rise in temperature and pressure mentioned above.

The control unit (70) assesses the throttle requirements, the engine timing position from the sensors (55), the engine temperature, and other engine data to control the timely operation of the fuel and air injectors (50, 51) and the spark plugs (49) for ignition. The control unit (70) also controls the timely operation of the rotary engine as a motor, and can switch between operation as an engine and operation as a motor by switch selections. This may be especially suited for forklift vehicles operating inside and outside of a factory to reduce or prevent build up of exhaust fumes inside the factory. When operating as a motor, an external source of energy, such as compressed air or steam, may be used.

As has been mentioned earlier, this engine is door speed limited, not RPM speed limited. Also, this engine is easy to start (and restart), and so there is no need to idle the engine. The engine can be started (or restarted) easily with compressed air alone if it stops at any position other than the dead band position. If it stops at the dead band position, then only a low energy starter motor would be required, as the frictional drag of rotation is small.

It may not be necessary to use cup seals (42b) on the piston plates (42, 42d) if the clearance gaps are very small and bypassing of chamber gases is kept low.

A minimal pressure of compressed air from the accumulator needs to be maintained in order to start the engine, which will then, when started, generate further supplies of compressed air to operate the engine and to build up pressure in the accumulator for future use. During engine operation, rotation of the output shaft is used to pre-charge the accumulators (65, 68) with pressurized air and fuel at times which are out of synchronization with the engine's usage from the accumulators.

Although not shown, cooling of the engine may be by air flow over fins built into the outer surfaces of the engine, or by a water cooling system incorporated into its construction and connected to a radiator by hoses.

A drain valve (nil chamber pressure), also not shown, is positioned at the lowest point of the chamber to return collected oil to a sump when the engine is not operating.

It will also be readily apparent to persons skilled in the art that various modifications may be made in details of design and construction of the embodiments of the rotary engine, and in the steps of using the assembly described above, without departing from the scope or ambit of the present invention.

For example, it is possible to use one door plate only in the or each door assembly, although this is not ideal, as there will be no cancellation of opposite forces and momentum across the engine as occurs with the two door plate system described earlier.

It is also possible to use one piston plate only in the rotor, although this is not ideal, as the centre of explosive forces within the engine would not be the shaft axis, and so unbalanced forces would be exerted on the rotor to urge it to move in directions other than in a rotational direction about the shaft axis, with resultant unbalanced forces on the bearings. When two or more (evenly spaced apart) piston plates are used, the forces within the engine are balanced and this enables the rotor to rotate through the annular chamber with great accuracy and with minimum clearances to the side wall plates and to the outer ring, thus resulting in less bypassing of chamber gases.

The reference in this specification to any prior publication (or information derived from it), or to any matter which is known, is not, and should not be taken as, an acknowledgement or admission or any form of suggestion that that prior publication (or information derived from it) or known matter forms part of the common general knowledge in the field of endeavour to which this specification relates before the filing date of this patent application.

The invention claimed is:

1. A rotary engine comprising a housing, a drive shaft extending through the housing, a rotor coupled to the drive shaft, the rotor including a main body and a piston extending outwardly therefrom, the main body adapted to fit within the housing so as to form an annular chamber with the walls of the housing, the piston being movable within the annular chamber along a circular path and being shaped to fit closely to the walls of the annular chamber so as to provide a substantial seal without being prohibited from rotation, first and second cam assemblies mounted on the drive shaft on opposite sides externally of the housing, a door assembly operating to block and unblock the annular chamber, the door assembly actuated by synchronous rotation of the first and second cam assemblies such that the door assembly opens to unblock the annular chamber as the piston approaches the door assembly and closes to block the annular chamber after the piston has travelled past the door assembly, a temporary combustion chamber being formed between the door assembly and the piston as the piston moves away from the door assembly, a fluid inlet for providing a working fluid into the temporary combustion chamber, a fuel inlet for providing a fuel into the temporary combustion chamber, an ignition source, an exhaust path from the annular chamber, wherein, in use, the ignition source ignites a mixture of the fuel and the working fluid within the temporary combustion chamber and the explosion therefrom forces the piston along the circular path to thereby rotate the drive shaft, and wherein the piston releases pressure from the explosion within the chamber by uncovering an exhaust hole from the chamber into the exhaust path as the piston moves towards the door assembly but before the door assembly is reopened, means for thereby generating a single power stroke of the rotary engine coincident with the movement of the piston along the circular path starting from when the mixture is ignited and ending when the piston reaches the exhaust hole, and thus enabling the door assembly to reopen without frictional resistance due to pressure of the explosion within the chamber.

2. The rotary engine of claim 1 wherein there is a plurality of door assemblies, each including first and second door plates movable with respect to one another, the door plates cooperating to block and unblock the annular chamber.

3. The rotary engine of claim 2 wherein the first and second door plates of each door assembly are guided by a door carriage assembly mounted in the housing.

4. The rotary engine of claim 2 or claim 3 wherein each cam assembly includes two or more inward cam lobes and two or more outward cam lobes which are operated to move the door plates.

5. The rotary engine of claim 1 wherein the piston is a piston plate, and there is a plurality of piston plates extending outwardly from the body of the rotor and evenly spaced about the circumference of the rotor.

6. The rotary engine of claim 2 wherein the door plates each have a slot therein adapted to allow passage of the piston therethrough such that when the slots align the annular chamber is unblocked, and the piston can pass through the aligned slots.

7. The rotary engine of claim 1 wherein the exhaust path includes an exhaust hole in the annular chamber which communicates with an exhaust port from the rotary engine, the exhaust hole being open when the piston is moving to the door assembly.

8. The rotary engine of claim 1 wherein the housing is cylinder shaped and comprises an outer ring between two opposed side wall plates and oil retaining covers which cover the side wall plates.

9. The rotary engine of claim 3 wherein each door carriage assembly allows the first and second door plates to slide with respect to one another within the door carriage assembly across the rotary engine.

10. The rotary engine of claim 8 wherein the drive shaft and the rotor rotate between the side wall plates on bearings in the side wall plates.

11. The rotary engine of claim 10 and further comprising ring seals in each side wall plate to prevent escape of gases from the combustion chamber.

12. The rotary engine of claim 4 wherein each cam assembly has a cam follower and pad to follow a movement of each lobe and convey the movement from a socket attached to an arm of the cam follower to a push rod.

13. The rotary engine of claim 12 wherein each cam follower pivots on a shaft fixed to a side wall plate.

14. The rotary engine of claim 4 wherein each door plate is pushed from a start position, defining a doors closed position, across the rotary engine in a first direction by movement of an outward cam lobe of the first cam assembly at one side of the housing until it reaches a maximum lobe extension position, defining a doors open position, while on the other side of the housing an inward cam lobe of the second cam assembly retreats with opposite movement, then the inward cam lobe of the second cam assembly pushes to cause the first door plate to move across the rotary engine in a second direction opposite to the first direction and return the first door plate to the start position, while similarly on the opposite side of the housing the outward cam lobe of the second cam assembly pushes the second door plate across the rotary engine until it reaches a maximum lobe extension position while the inward cam lobe of the first cam assembly retreats with opposite movement, then the inward cam lobe of the first cam assembly pushes to cause the second door plate to move back across the rotary engine to the doors closed position while the outward cam lobe of the first cam assembly retreats with opposite movement to the doors closed position.

15. The rotary engine of claim 14 wherein the door plates each have a slot therein adapted to allow passage of the piston therethrough, and the slot in each door plate is just wider than the width of the annular chamber, so that when the cam lobes are at their maximum lobe extension position the slots of the door plates are aligned and the piston can pass through the aligned slots without collision.

16. The rotary engine of claim 2 wherein, for each door assembly, the fuel inlet comprises a fuel injector, the fluid inlet comprises an air injector, and the ignition source comprises a spark plug located in the temporary combustion chamber formed between the door assembly and the piston as the piston moves away from the door assembly, and the exhaust hole is located between the closed door assembly and the piston as the piston moves towards the door assembly.

17. The rotary engine of claim 16 and further comprising an air compressor powered by the rotation of the drive shaft for supplying compressed air to an air accumulator and regulator to feed compressed air to the air injectors.

18. The rotary engine of claim 16 further comprising a fuel pump for supplying fuel under pressure to a fuel accumulator and regulator to feed fuel to the fuel injectors.

19. The rotary engine of claim 16 and further comprising an electronic control unit which is triggered by a sensor that detects the position of a rotating piston to timely control the fuel injectors, the air injectors and the spark plugs.

20. The rotary engine of claim 1 wherein the single power stroke of the rotary engine consists of a dead band section and a power producing section, and the power stroke is coincident with an exhaust stroke of the rotary engine.

* * * * *

UNITED STATES PATENT AND TRADEMARK OFFICE
CERTIFICATE OF CORRECTION

PATENT NO.       : 9,175,562 B2
APPLICATION NO.  : 13/417323
DATED            : November 3, 2015
INVENTOR(S)      : Raymond Charles Casey It is certified that error appears in the above-identified patent and that said Letters Patent is hereby corrected as shown below:

On the title page, change item 75 to item 76.

On the title page, below item 75, delete item 73, entirely.

In the claims,

Col. 16, line 39 reads ....means for thereby generating... should be corrected to read thereby generating.

Signed and Sealed this
Ninth Day of August, 2016

Michelle K. Lee
*Director of the United States Patent and Trademark Office*